United States Patent
Le Saint et al.

(10) Patent No.: US 11,201,743 B2
(45) Date of Patent: Dec. 14, 2021

(54) METHODS FOR SECURE CREDENTIAL PROVISIONING

(71) Applicant: Visa International Service Association, San Francisco, CA (US)

(72) Inventors: Eric Le Saint, Los Altos, CA (US); Soumendra Bhattacharya, Union City, CA (US)

(73) Assignee: Visa International Service Association, San Francisco, CA (US)

(*) Notice: Subject to any disclaimer, the term of this patent is extended or adjusted under 35 U.S.C. 154(b) by 274 days.

(21) Appl. No.: 16/566,651

(22) Filed: Sep. 10, 2019

(65) Prior Publication Data

US 2020/0021441 A1 Jan. 16, 2020

Related U.S. Application Data

(62) Division of application No. 15/008,388, filed on Jan. 27, 2016, now Pat. No. 10,461,933.

(Continued)

(51) Int. Cl.
*H04L 9/32* (2006.01)
*H04L 9/08* (2006.01)
(Continued)

(52) U.S. Cl.
CPC .......... *H04L 9/3226* (2013.01); *H04L 9/0822* (2013.01); *H04L 9/0825* (2013.01);
(Continued)

(58) Field of Classification Search
CPC ... H04L 9/3226; H04L 9/0822; H04L 9/0825; H04L 9/0841; H04L 9/0861;
(Continued)

(56) References Cited

U.S. PATENT DOCUMENTS 6,453,159 B1 9/2002 Lewis
7,254,232 B2 8/2007 DiSanto et al.
(Continued)

FOREIGN PATENT DOCUMENTS

CN 101286842 10/2008
CN 102656599 9/2012
(Continued)

OTHER PUBLICATIONS

"Tomorrow's Transactions", HCE and BLE University, London, Consult Hyperion, Available Online at http://tomorrowstransactions.com, Mar. 20, 2014, 18 pages.
(Continued)

*Primary Examiner* — Daniel B Potratz
(74) *Attorney, Agent, or Firm* — Kilpatrick Townsend & Stockton LLP

(57) ABSTRACT

Embodiments can provide methods for securely provisioning sensitive credential data, such as a limited use key (LUK) onto a user device. In some embodiments, the credential data can be encrypted using a separate storage protection key and decrypted only at the time of a transaction to generate a cryptogram for the transaction. Thus, end-to-end protection can be provided during the transit and storage of the credential data, limiting the exposure of the credential data only when the credential data is required, thereby reducing the risk of compromise of the credential data.

20 Claims, 14 Drawing Sheets

Related U.S. Application Data

(60) Provisional application No. 62/108,468, filed on Jan. 27, 2015.

(51) Int. Cl.
*H04L 29/06* (2006.01)
*H04L 9/14* (2006.01)

(52) U.S. Cl.
CPC .......... *H04L 9/0841* (2013.01); *H04L 9/0861* (2013.01); *H04L 9/0891* (2013.01); *H04L 9/0894* (2013.01); *H04L 9/321* (2013.01); *H04L 63/045* (2013.01); *H04L 63/0428* (2013.01); *H04L 63/0435* (2013.01); *H04L 9/14* (2013.01); *H04L 2209/56* (2013.01)

(58) Field of Classification Search
CPC ..... H04L 9/0891; H04L 9/0894; H04L 9/321; H04L 9/14; H04L 63/0428; H04L 63/0435; H04L 63/045
See application file for complete search history.

(56) References Cited

U.S. PATENT DOCUMENTS

| | | | |
|---|---|---|---|
| 7,627,760 | B2 | 12/2009 | Lauter et al. |
| H2270 | H | 6/2012 | Le Saint et al. |
| 8,200,974 | B1 | 6/2012 | DiSanto et al. |
| 8,447,990 | B2 | 5/2013 | Utin |
| 8,904,180 | B2* | 12/2014 | Allen .................. H04L 9/0825 713/171 |
| 9,813,245 | B2 | 11/2017 | Le Saint et al. |
| 10,389,533 | B2 | 8/2019 | Le Saint et al. |
| 10,461,933 | B2 | 10/2019 | Le Saint et al. |
| 2003/0005317 | A1 | 1/2003 | Audebert et al. |
| 2003/0115453 | A1 | 6/2003 | Grawrock |
| 2004/0017499 | A1 | 1/2004 | Ambiru |
| 2004/0174997 | A1* | 9/2004 | Yamamichi .......... H04L 9/0869 380/44 |
| 2005/0084114 | A1 | 4/2005 | Jung et al. |
| 2006/0242407 | A1 | 10/2006 | Kimmel et al. |
| 2006/0265595 | A1 | 11/2006 | Scottodiluzio |
| 2007/0028090 | A1 | 2/2007 | Lopez et al. |
| 2007/0033403 | A1 | 2/2007 | Lauter et al. |
| 2007/0288743 | A1 | 12/2007 | Cam-Winget et al. |
| 2008/0040603 | A1 | 2/2008 | Stedron |
| 2008/0133918 | A1 | 6/2008 | You et al. |
| 2009/0006019 | A1 | 1/2009 | Kang et al. |
| 2009/0044019 | A1 | 2/2009 | Lee et al. |
| 2009/0060197 | A1 | 3/2009 | Taylor et al. |
| 2009/0318114 | A1 | 12/2009 | Bertoni |
| 2010/0100724 | A1 | 4/2010 | Kaliski, Jr. |
| 2011/0307698 | A1 | 12/2011 | Vanstone |
| 2012/0029444 | A1 | 2/2012 | Anderson et al. |
| 2012/0082312 | A1 | 4/2012 | Liu et al. |
| 2012/0087493 | A1 | 4/2012 | Chidambaram et al. |
| 2012/0137132 | A1 | 5/2012 | Le Saint |
| 2012/0144193 | A1 | 6/2012 | Le Saint et al. |
| 2012/0221858 | A1 | 8/2012 | Struik |
| 2012/0294445 | A1* | 11/2012 | Radutskiy .............. H04L 9/0863 380/278 |
| 2012/0314865 | A1 | 12/2012 | Kitchen |
| 2013/0008076 | A1 | 1/2013 | Stenklyft |
| 2013/0016831 | A1 | 1/2013 | Lambert et al. |
| 2013/0080768 | A1 | 3/2013 | Lagerway et al. |
| 2013/0091353 | A1 | 4/2013 | Zhang et al. |
| 2013/0111209 | A1 | 5/2013 | Harkins |
| 2013/0195271 | A1 | 8/2013 | Miyabayashi et al. |
| 2013/0219189 | A1 | 8/2013 | Simmons |
| 2013/0301828 | A1 | 11/2013 | Gouget et al. |
| 2013/0332739 | A1 | 12/2013 | et al. |
| 2014/0003604 | A1 | 1/2014 | Campanga et al. |
| 2014/0009308 | A1 | 1/2014 | Abuelsaad et al. |
| 2014/0013121 | A1 | 1/2014 | Sherkin et al. |
| 2014/0093084 | A1 | 4/2014 | De Atley et al. |
| 2014/0108262 | A1 | 4/2014 | Plateaux et al. |
| 2014/0208117 | A1 | 7/2014 | Hayashi et al. |
| 2014/0281542 | A1 | 9/2014 | Bono et al. |
| 2014/0365776 | A1 | 12/2014 | Smets et al. |
| 2015/0019443 | A1 | 1/2015 | Sheets et al. |
| 2015/0088756 | A1 | 3/2015 | Makhotin et al. |
| 2015/0200774 | A1 | 7/2015 | Le Saint |
| 2015/0372811 | A1 | 12/2015 | Le Saint et al. |
| 2016/0065370 | A1 | 3/2016 | Le Saint et al. |
| 2016/0149705 | A1* | 5/2016 | Bobinski .............. H04L 63/0838 713/155 |
| 2016/0218875 | A1 | 7/2016 | Le Saint et al. |
| 2018/0026787 | A1 | 1/2018 | Le Saint et al. |

FOREIGN PATENT DOCUMENTS

| | | |
|---|---|---|
| CN | 106797311 | 5/2017 |
| CN | 107210914 | 9/2017 |
| EP | 1906587 | 4/2008 |
| EP | 2073430 | 6/2009 |
| EP | 3195521 | 7/2017 |
| EP | 3251284 | 12/2017 |
| KR | 1020080074956 | 8/2008 |
| RU | 2364049 | 8/2009 |
| SG | 11201704984 S | 6/2018 |
| WO | 2013023968 | 2/2013 |
| WO | 2014109283 | 7/2014 |
| WO | 2016033610 | 3/2016 |
| WO | 2016123264 | 8/2016 |
| WO | 2017214288 | 12/2017 |

OTHER PUBLICATIONS

U.S. Appl. No. 14/841,589, "Non-Final Office Action", dated Dec. 16, 2016, 11 pages.
U.S. Appl. No. 14/841,589, "Notice of Allowance", dated Jun. 30, 2017, 8 pages.
U.S. Appl. No. 15/008,388, "Non-Final Office Action", dated Jan. 24, 2019, 17 pages.
U.S. Appl. No. 15/008,388, "Notice of Allowance", dated Jun. 12, 2019, 11 pages.
U.S. Appl. No. 15/008,388, "Restriction Requirement", dated Sep. 27, 2018, 7 pages.
U.S. Appl. No. 15/723,001, "Corrected Notice of Allowability", dated Jul. 22, 2019, 2 pages.
U.S. Appl. No. 15/723,001, "Final Office Action", dated Nov. 28, 2018, 7 pages.
U.S. Appl. No. 15/723,001, "Non-Final Office Action", dated Mar. 9, 2018, 13 pages.
U.S. Appl. No. 15/723,001, "Notice of Allowance", dated Mar. 20, 2019, 6 pages.
AU2015308608, "First Examination Report", dated Dec. 11, 2018, 3 pages.
EP15835007.4, "Extended European Search Report", dated Feb. 9, 2018, 8 pages.
EP15835007.4, "Office Action", dated Feb. 14, 2019, 7 pages.
EP16744062.7, "Extended European Search Report", dated Jul. 6, 2018, 10 pages.
EP16818857.1, "Extended European Search Report", dated May 14, 2018, 9 pages.
Garrett et al., "Blinded Diffie-Hellman Preventing Eavesdroppers from Tracking Payments", EMVCo Security Working Group, Security Standardisation Research, Available online at: www.emvco.com, Dec. 16, 2014, pp. 79-92.
PCT/US2015/047824, "International Preliminary Report on Patentability", dated Mar. 9, 2017, 10 pages.
PCT/US2015/047824, "International Search Report and Written Opinion", dated Dec. 8, 2015, 11 pages.
PCT/US2016/015218, "International Preliminary Report on Patentability", dated Aug. 10, 2017, 14 pages.
PCT/US2016/015218, "International Search Report and Written Opinion", dated May 12, 2016, 17 pages.
PCT/US2017/036380, "International Preliminary Report on Patentability", dated Dec. 20, 2018, 10 pages.

(56) References Cited

OTHER PUBLICATIONS

PCT/US2017/036380 , "International Search Report and Written Opinion", dated Oct. 13, 2017, 14 pages.
RU2017106105 , "Office Action", dated Mar. 13, 2019, 15 pages.
SG11201704984S , "Notice of Decision to Grant", dated Apr. 18, 2018, 8 pages.
Application No. BR1120170146320 , Office Action, dated Jul. 28, 2020, 7 pages.
CN201680007305.2 , "Office Action", dated Jan. 3, 2020, 18 pages.
U.S. Appl. No. 16/443,610 , Final Office Action, dated Nov. 17, 2020, 6 pages.
AU2019240671 , "First Examination Report", dated Dec. 1, 2020, 4 pages.
CN201580046148.1 , "Office Action", dated Oct. 9, 2019, 10 pages.
RU2017106105 , "Notice Of Decision To Grant", dated Oct. 23, 2019, 22 pages.
AU2016211551 , "First Examination Report", dated Sep. 19, 2019, 3 pages.

\* cited by examiner

Request Message 1202

| 1204 | 1206 | 1208 |
|---|---|---|
| Clear text (one-time pub key) ☆ | Cipher Text ID Data | MAC |

Response Message 1210

| 1212 | 1218 | 1214 | 1216 |
|---|---|---|---|
| Clear text (server Blinded key) | Cipher Text (LUK) 1220 / MAC 1222 | Cipher Text | MAC |

☆ Encrypt Main response with SK_s

☆ Encrypt sensitive credentials with separate storage key (Same life cycle as LUK)

*FIG. 12*

Request Message 1302

1304 Clear text (one-time pub key)

1306 Cipher Text: Limited use storage protection pub key. New key for each transaction 1307

1308 MAC

Response Message 1310

1312 Clear text (server Blinded key) — Encrypt Main response with SK_s

1314 Cipher Text

1318: Cipher Text (LUK) 1320 | MAC 1322 — Encrypt sensitive credentials with separate storage key (Same life cycle as LUK)

1316 MAC

*FIG. 13*

METHODS FOR SECURE CREDENTIAL PROVISIONING

CROSS-REFERENCE TO RELATED APPLICATIONS

The present application is divisional of U.S. patent application Ser. No. 15/008,388, filed Jan. 27, 2016, which claims benefit to and is the nonprovisional of U.S. Provisional Application 62/108,468, filed on Jan. 27, 2015, which is incorporated by reference for all purposes in its entirety. The present application is related to U.S. application Ser. No. 14/841,589, filed Aug. 31, 2015 (now U.S. Pat. No. 9,813,245), which is incorporated by reference for all purposes in its entirety.

BACKGROUND

As user devices such as NFC-enabled mobile phones and contactless cards continue to increase in popularity, maintaining the security of payment and other transactions continues to be a concern. For instance, in order to conduct a payment transaction, it is typically necessary to authenticate the user device. One method for authenticating a user device is through the use of a cryptogram generated by the device. The cryptogram is typically generated using sensitive credential data provisioned from a server. If an attacker gains access to the sensitive credential data, he can potentially forge the cryptogram. Thus, the security of the credential data is essential to conducting secure transactions. However, it is a challenge to provide adequate protection of the credential data during transmit and storage as attackers may eavesdrop on the provisioning messages or breach user devices.

Embodiments of the present invention address these problems and other problems individually and collectively.

BRIEF SUMMARY

Embodiments relate to systems and methods for securely provisioning credential data. Techniques described herein can provide end-to-end protection of sensitive credential data during and after the provisioning process, so as to minimize the risk of exposure of the credential data.

According to some embodiments, a computer-implemented method is provided. A one-time user or client public key can be determined by a user device. The user device can send a provisioning request message including the one-time user public key to a provisioning server computer. An encrypted provisioning response message can be received by the user device from the provisioning server computer, the encrypted provisioning response message comprising encrypted credential data. The user device can determine a response shared secret using a static server public key. The user device can determine a response session key from the response shared secret, the response session key usable for decrypting the encrypted provisioning response message. The user device can decrypting, by the user device, the encrypted provisioning response message using the response session key to determine the encrypted credential data. A storage protection key can be determined from the response shared secret, the storage protection key being different from the response session key and usable for decrypting the encrypted credential data. The storage protection key can be encrypted using a key encryption key to generate an encrypted storage protection key. The encrypted storage protection key can be stored. The encrypted credential data can be stored.

The credential data can include a limited use key (LUK) or key derivation data for a single use key (SUK). The encrypted credential data can be stored in a storage server remotely connected to the user device and the encrypted storage protection key can be stored in the user device.

In response to an indication to generate a cryptogram used for authenticating an authorization request message, the encrypted credential data can be retrieved. The encrypted storage protection key can be retrieved. The encrypted storage protection key can be decrypted using the key encryption key to obtain the storage protection key. The encrypted credential data can be decrypted using the storage protection key to obtain the credential data. And the cryptogram can be generated using the credential data. In some embodiments, decrypting the encrypted credential data using the storage protection key comprises deriving a credential encryption key using the storage protection key and key derivation data for the credential encryption key, the key derivation data comprises data specific to the user device and decrypting the encrypted credential data using the credential encryption key. In some embodiments, the cryptogram is generated using a cryptogram key derived from the credential data.

The user device can generate a request shared secret using a user private key corresponding to the one-time user public key and the static server public key. Request data can be encrypted using the request shared secret to obtain encrypted request data, wherein the provisioning request message includes the encrypted request data.

The provisioning response message can include a blinded static server public key and the response shared secret can be determined using the blinded static server public key.

Determining the one-time user public key can comprise generating an ephemeral user key pair comprising an ephemeral user private key and an ephemeral user public key, wherein the ephemeral user public key is used as the one-time user public key. Alternatively, determining the one-time user public key can comprise blinding a static user public key.

According to some embodiments, a computer-implemented method is provided. A server computer can receive a provisioning request message from a user device including a one-time user public key. A response shared secret can be generated using a static server private key and the one-time user public key. Credential data to be included in a provisioning response message can be identified. A response session key can be determined from the response shared secret, the response session key usable for encrypting the provisioning response message. A storage protection key can be determined from the response shared secret, the storage protection key being different from the response session key and usable for encrypting the credential data. The credential data can be encrypted using the storage protection key to generate encrypted credential data. The provisioning response message can be encrypted using the response session key to generate encrypted provisioning response message, wherein the provisioning response message includes the encrypted credential data. The server computer can send the encrypted provisioning response message to the user device.

The credential data can comprise a LUK and cryptogram key derivation data usable for deriving a cryptogram key that is used to generate a cryptogram.

Encrypting the credential data can comprise determining a credential encryption key using the storage protection key and key derivation data, wherein the key derivation data is specific to the user device. The provisioning response message can include a blinded static server public key corresponding to the static server private key.

According to some embodiments, a computer-implemented method is provided. A one-time user public key can be determined by a user device. The storage protection public key can be determined. A provisioning request message can be sent to a provisioning server computer, including the one-time user public key and the storage protection public key. An encrypted provisioning response message can be received from the provisioning server computer, the encrypted provisioning response message comprising encrypted credential data, wherein the encrypted credential data is encrypted using the storage protection public key. A response shared secret can be determined using a static server public key. A response session key can be determined from the response shared secret, the response session key usable for decrypting the encrypted provisioning response message. The encrypted provisioning response message can be decrypted using the response session key to determine the encrypted credential data. The encrypted credential data can be stored.

The storage protection public key and the one-time user public key can both correspond to a same user private key. Alternatively, the storage protection public key and the one-time user public key correspond to different user private keys.

In response to an indication to generate a cryptogram used for authenticating an authorization request message, the encrypted credential data can be retrieved. The encrypted credential data can be decrypted using a storage protection private key corresponding to the storage protection public key to obtain the credential data. The cryptogram can be generated using the credential data.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 12 shows a first example of a provisioning request message and a corresponding provisioning response message, in accordance with some embodiments.

FIG. 13 shows a second example of a provisioning request message and a corresponding provisioning response message, in accordance with some embodiments.

TERMS

Figure 1:
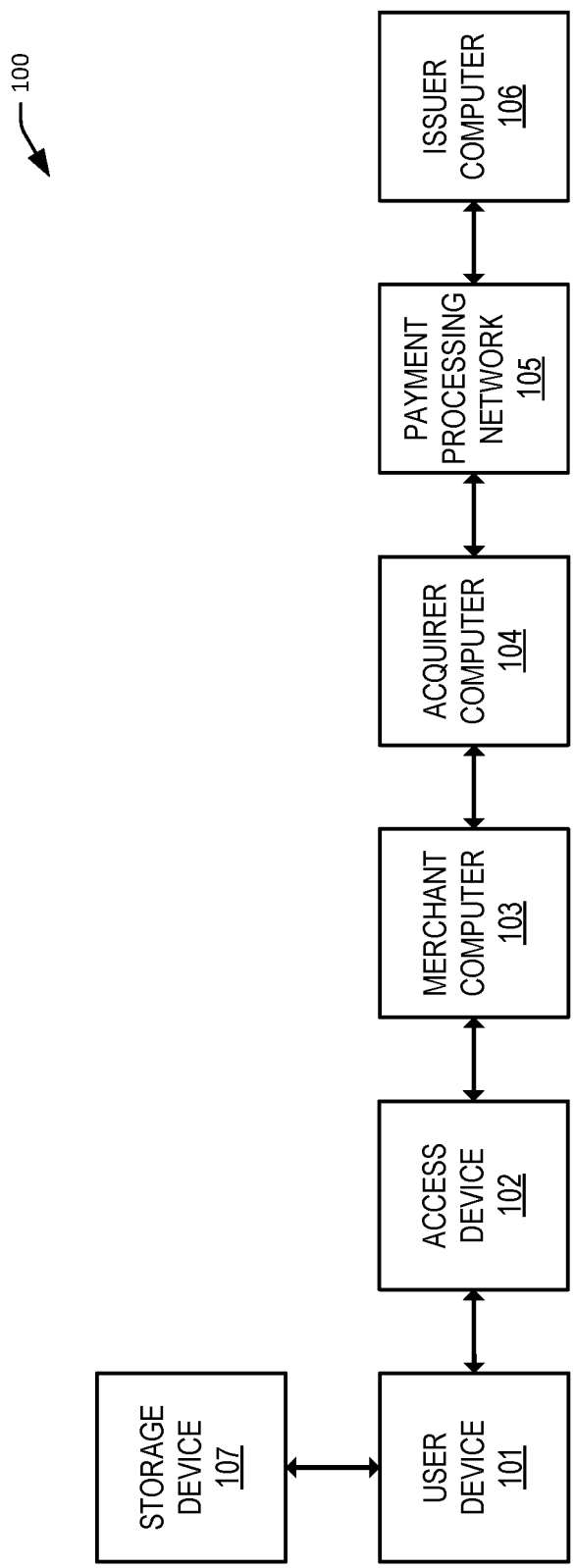
FIG. 1 shows an example payment system, in accordance with some embodiments.

Prior to discussing embodiments of the invention, description of some terms may be helpful in understanding embodiments of the invention.

The term "server computer" may include a computer or cluster of computing devices. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers (e.g., user devices). The server computer may comprise one or more computational apparatuses and may use any of a variety of computing structures, arrangements, and compilations for servicing the requests from one or more client computers.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. For example, the cryptographic nonce can be a random number. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key."

A "one-time key" refers to a key that is provided for one-time only. A one-time key can includes a key from an ephemeral key pair, such as described below. In some embodiments, one-time keys can include blinded keys that are generated using the same static key (e.g., a static public key) but blinded using different cryptographic nonce, identification factor, or other blinding factors.

An "ephemeral key pair" may include a public key (i.e., an "ephemeral public key") and a private key (i.e., an "ephemeral private key) generated for use with a single transaction or other communication session. The ephemeral key pair may be of any suitable format, such as ECC or RSA. Typically, an ephemeral key pair may be deleted once the transaction or communication session has concluded.

A "static key pair" may include a public key (i.e., a "static public key") and a private key (i.e., a "static private key") maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. In some cases, a shared secret may be used to generate a session key.

The term "identification data" may include any data or information associated with a user or device. Examples of identification data may include a name of a user associated with the device, an organization associated with the device, payment information such as a primary account number (PAN) or token associated with the device, an expiration date of the PAN or token, a certificate associated with the device, an IMEI or serial number of the device, etc.

The term "authentication data" may include any data or information suitable to authenticate a user or device. Examples of authentication data may include a password or passphrase, a cryptographic key (e.g., a private key), a certificate, biometric data associated with a user (e.g., fingerprint, voice, facial image, iris/retina scan), and the like.

An "identification factor" may include any data or information determined from identification data and/or authentication data. Typically, though not necessarily, the identification factor may be generated by hashing a combination of identification data and authentication data.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "session key" may include any key used to encrypt or decrypt data to be securely communicated. In some cases, a session key may be generated from a shared secret known both to a sending entity and a receiving entity. For example, the session key may be derived using a key derivation function and the shared secret. A session key can be used to protect data included in a request or response message. In such cases, a session key can also be referred to as a message protection key.

"Credentials" or "credential data" may include any data that is provisioned from a server to a user device (e.g., mobile device) that enables the user device to conduct transactions (e.g., payment transactions). Examples of credential data can include tokens, PAN, or other account information, one or more keys (e.g., LUKs used to generate cryptograms, encryption key, blinded or unblended static public keys, etc.), key derivation parameters (e.g., for deriving a SUK that is used to generate a cryptogram, a shared secret key, an encryption key, etc.), cryptogram derivation parameters, certificate chain information, transaction parameters, and any other suitable data.

A "storage protection key" or "credential protection key" can include an encryption key that is used to protect the credential data or any other sensitive data. For instance, the storage protection key can be used directly to encrypt or decrypt the credential data. A storage protection key can also be used indirectly to encrypt or decrypt the credential data. For instance, the storage protection key can be used to derive another encryption key that is then used to encrypt or decrypt the credential data. In some embodiments, storage protection key can include a private/public key pair. The public key may be used to encrypt the credential data whereas the private key may be used to decrypt the credential data.

A "limited use key" (LUK) may include any encryption key or other data that may be used a limited number of times. An LUK may be used for any suitable purpose. For example, in some embodiments, an LUK may be used to generate a cryptogram for a transaction.

A "single use key" (SUK) is a LUK that can be only used once. For example, a SUK may be used to encrypt and/or decrypt data related to a single transaction. In some embodiments, a SUK can be derived from a LUK.

A "cryptogram" may include any data element or other information used to authenticate an entity such as a device or a user. For example, a cryptogram may comprise static (i.e., predetermined) data, dynamic data, or a combination of the two that is encrypted using an encryption key (e.g., an LUK). A cryptogram may be used in any suitable context. For example, a "registration cryptogram" may include a cryptogram that is used to confirm the registration of an entity. A "transaction cryptogram" may include a cryptogram that is used to authenticate an entity conducting a transaction.

DETAILED DESCRIPTION

Embodiments can provide methods for securely provisioning sensitive credential data, such as a limited use key (LUK) onto a user device. In some embodiments, the credential data can be encrypted using a separate storage protection key and decrypted only at the time of a transaction to generate a cryptogram for the transaction. Thus, end-to-end protection can be provided during the transit and storage of the credential data, limiting the exposure of the credential data only when the credential data is required, thereby reducing the risk of compromise of the credential data.

For example, in one embodiment, a user device can determine a one-time user public key and send a provisioning request message including the one-time user public key to a provisioning server computer. The provisioning server computer can identify credential data (e.g., LUK) to be included in a provisioning response message. The server computer can generate a response shared secret using the one-time user public key and a static server private key. The response shared secret can be used to determine both a response session key and a storage protection key. The storage protection key can be used to encrypt the credential data to generate encrypted credential data. The encrypted credential data can be included in the provisioning response message. The provisioning response message can be encrypted using the response session key and sent to the user device.

The user device can derive the response shared secret using the static server public key and a user private key corresponding to the user public key. The user device can determine a response session key from the response shared secret and decrypting the encrypted provisioning response message using the response session key to determine the encrypted credential data. The user device can also determine the storage protection key from the response shared secret. The encrypted credential data can be stored as is, without being decrypted, at the user device or an external storage provider. The storage protection key can also be optionally encrypted before being stored.

At the time of a transaction, the encrypted credential data can be retrieved and decrypted using the storage protection key. The decrypted credential data can be used to generate a cryptogram that can be used to conduct a transaction.

Accordingly, end-to-end protection can be provided for the sensitive credential data. The credential data stays encrypted during transmit, so even if an attacker intercepts the provisioning request message, he would not be able to decrypt the credential data without the access to the storage protection key. Furthermore, the credential data stays encrypted at rest, so that in the unlikely event that the storage device (e.g., user device) is compromised, the credential data is protected from attackers. Since the credential data is stored in an encrypted form, an attacker could not make use of the credential data unless the attacker also had possession of the storage protection key. Furthermore, some embodiments may store the storage protection key and the encrypted credential data in different locations. For example, the storage protection key may be stored in a secure element. Such embodiments may further mitigate the risk of a compromise.

In addition, some embodiments can provision an encrypted credential data onto a previously unauthenticated user device using only two messages: a provisioning request message from a user device, and a provisioning response message to the user device. Thus, embodiments can provide the above benefits while reducing both the time and the processing needed to provision the user device. The above examples highlight only a few of the advantages provided by embodiments of the invention.

I. Systems

Embodiments are usable with various authorization systems, e.g., payments systems, document access system, building access system, and the like. Although examples of payment systems are described, embodiments are equally applicable for other authorization systems.

A. Payment System

FIG. 1 shows an example payment system 100, in accordance with some embodiments. The system comprises a user (not shown) who may operate a user device 101. The user may use user device 101 to conduct payment transactions in communication with an access device 102. As used herein, a "user device" may include a desktop computer, laptop computer, mobile phone, tablet, credit card, debit card, or any suitable computing device. As used herein, an "access device" may include any computing device, such as a point of sale (POS) terminal or web server, suitable to communicate with a user device. In some embodiments, access device 102 may directly communicate with user device 101. In other embodiments, access device 102 may communicate to user device 101 via an interface device, such as a smart watch, smart glasses, or any other suitable device. Access device 102 may be connected to merchant computer 103, which may be connected to acquirer computer 104. Acquirer computer 104 may be connected to issuer computer 106 via payment processing network 105. The user device 101 may optionally communicate with a storage device 107 that may be operably connected to the user device 101. The storage device 107 may include or be included in any suitable local or remote data storage server, system, or service that is provided by a storage provider. The storage provider may not be the same entity that provides devices 101-106. For example, the storage device 107 may be part of a cloud-based storage service provided by an external cloud-storage provider. Any or all of devices 101-107 may be implemented using one or more computing devices such as server computers.

As used herein, an "issuer" may typically refer to a business entity (e.g., a bank) that maintains financial accounts for a user and often issues or provisions a user device 101, such as a credit or debit card, or mobile device, to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., access device 102, merchant computer 103, acquirer computer 104, payment processing network 105, and issuer computer 106) to enable communication or to perform one or more of the functions described herein.

The payment processing network 105 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In some payment transactions, the user purchases a good or service at a merchant using a user device 101. User device 101 can interact with an access device 102 at a merchant associated with merchant computer 103. For example, the user may tap user device 101 against an NFC reader in the access device 102. Alternatively, the user may indicate payment details to the merchant over a computer network, such as in an online or e-commerce transaction.

An authorization request message for a transaction may be generated by access device 102 or merchant computer 103 and then forwarded to the acquirer computer 104. After receiving the authorization request message, the acquirer computer 104 sends the authorization request message to the payment processing network 105. The payment processing network 105 then forwards the authorization request message to the corresponding issuer computer 106 associated with an issuer associated with the user or user device 101.

An "authorization request message" may be an electronic message that is sent to a payment processing network and/or an issuer to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 106 receives the authorization request message, the issuer computer 106 sends an authorization response message back to the payment processing network 105 to indicate whether the current transaction is authorized (or not authorized). The payment processing network 105 then forwards the authorization response message back to the acquirer computer 104. In some embodiments, payment processing network 105 may decline the transaction even if issuer computer 106 has authorized the transaction, for example depending on a value of the fraud risk score. The acquirer computer 104 then sends the response message back to the merchant computer 103.

An "authorization response message" may be an electronic message reply to an authorization request message generated by an issuer computer 106 and/or a payment processing network 105. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an issuer returns in response to an authorization request message in an electronic message (either directly or through the payment processing network 105) to the merchant computer 103 that indicates approval of the transaction. The code may serve as proof of authorization. As noted above, in some embodiments, a payment processing network 105 may generate or forward the authorization response message to the merchant, typically via acquirer computer 104.

After the merchant computer 103 receives the authorization response message, the merchant computer 103 may then provide the authorization response message for the user. The response message may be displayed by the access device 102, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 105. A clearing process is a process of exchanging financial details between an acquirer and an issuer to facilitate posting to a customer's payment account and reconciliation of the user's settlement position.

B. User Device

Figure 2:
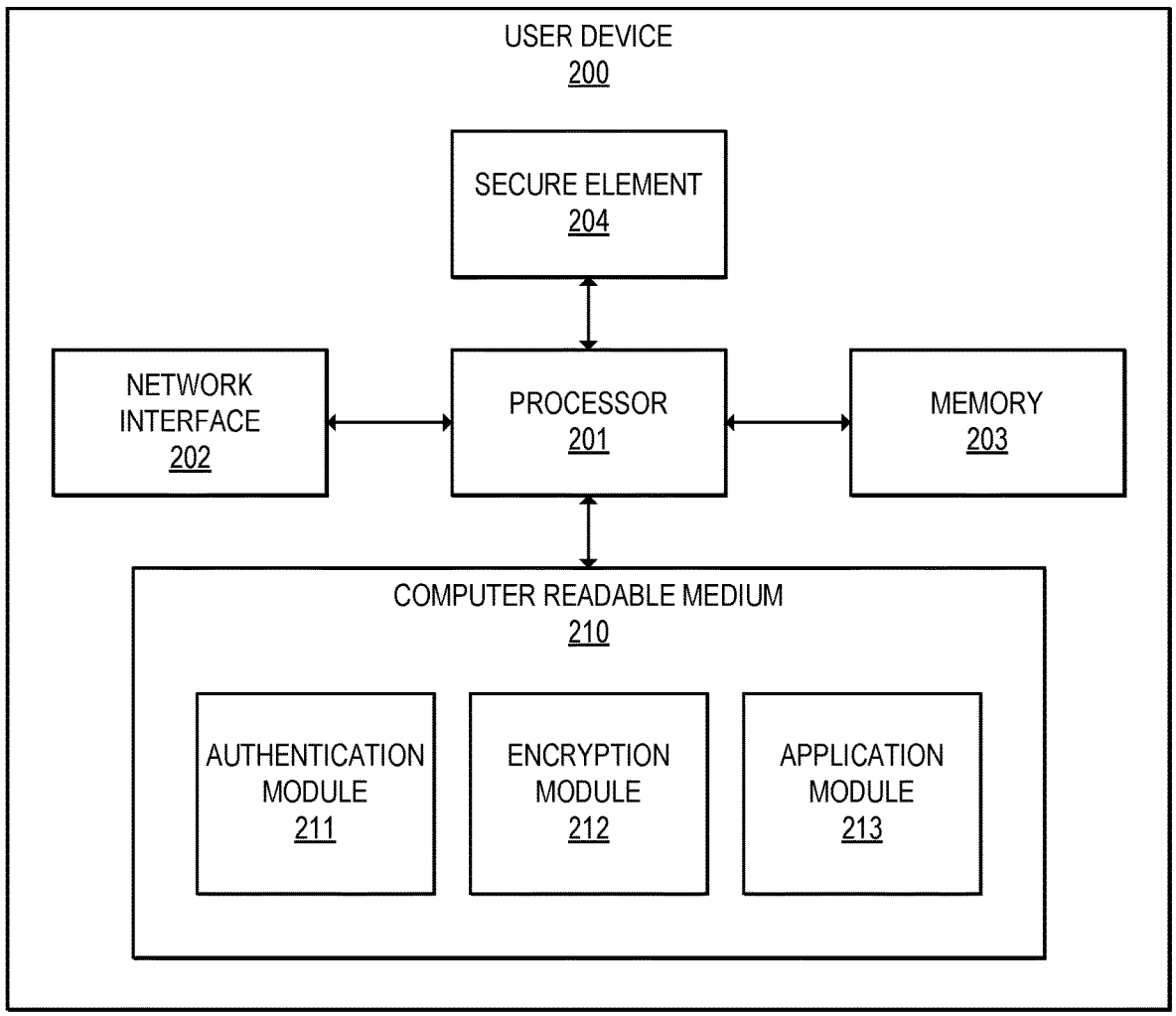
FIG. 2 shows an example of a user device, in accordance with some embodiments.

FIG. 2 shows an example of a user device 200, in accordance with some embodiments. For example, the user device 200 may include or be included in the user device 101 described in FIG. 1. Examples of user devices 200 may include mobile phones, tablets, desktop and laptop computers, wearable devices (e.g., smart watches, fitness bands, ankle bracelets, rings, earrings, etc.), or any other computing devices capable of receiving, storing, and transmitting data.

The user device 200 can be configured to communicate directly or indirectly with a server computer 300 to implement the methods described herein. User device 200 may include a processor 201 communicatively coupled to a network interface 202, a memory 203, a computer readable medium 210, and optionally, a secure element 204.

The processor 201 can comprise one or more CPUs, each of which may comprise at least one processor cores operable to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. In some cases, processor 201 can include multiple CPUs coupled over a network, such as in a distributed or cluster computing system.

The network interface 202 may be configured to allow computing device 200 to communicate with other entities such devices 101-107, other computing devices, etc. using one or more communications networks. Network interfaces may accept, communicate, and/or connect to a communications network. Network interfaces may employ connection protocols such as, but not limited to: direct connect, Ethernet (thick, thin, twisted pair 10/100/1300 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); a secured custom connection; a Wide Area Network (WAN); a wireless network (e.g., employing protocols such as, but not limited to a Wireless Application Protocol (WAP), I-mode, and/or the like); and/or the like.

The memory 203 may be used to store data and code. The memory 203 may be coupled to the processor 201 internally or externally (e.g., cloud based data storage), and may comprise any combination of volatile and/or non-volatile memory, such as RAM, DRAM, ROM, flash, or any other suitable memory device.

The secure element 204 may include a tamper-resistant module capable of securely hosting sensitive applications and/or data. Such applications and/or data may be related to payment applications, authentication/authorization, cryptographic key management, and the like. For example, some or all portions of credentials, cryptographic keys or key materials, cryptograms, shared secrets, account information, and the like, may be provisioned onto the secure element 204 of the user device 200 to protect against unauthorized access. In some embodiments, the secure element 204 may include or be included in any combination of software-based (such as host card emulation or HCE) and/or hardware-based (such as a hardware security module or HSM, a smart card, or chip card) security modules.

The computer-readable medium 210 may be in the form of a memory (e.g., flash, ROM, etc.) and may comprise code, executable by the processor 201 for implementing the methods described herein. The computer readable medium 210 may include an authentication module 211, an encryption module 212, and an application module 213. In various embodiments, such modules may be configured to perform, individually or collectively, some or all of methods 400, 1100, 1400, 1200, 1300, 1700, 11100 of FIGS. 4-5, 8, 11, 12, 15, and 18, respectively.

Authentication module 211 may include any program, software, or other code suitable to authenticate computing device 200 to another computing device, or authenticate another computing device at computing device 200. For example, authentication module 211 may be configured to generate and send an authentication request message to another computing device, and receive and process an authentication response message from the other computing devices. Similarly, authentication module 211 may be configured to receive and process an authentication request message from another computing device, and generate and send an authentication response message to the other computing device.

Encryption module 212 may include any program, software, or other code suitable to perform operations related to encryption and/or decryption. For example encryption module may be configured to generate a shared secret, such as using a key agreement protocol such as Diffie-Hellman. Encryption module 212 may be further configured to derive a session key or storage protection key from a shared secret, such as using a key derivation function (KDF). In some embodiments, encryption module 212 may be configured to store one or more static keys, such as a static user device private key or a static server private key. In some embodiments, encryption module 212 may be implemented using any combination of software (such as host card emulation or HCE) and hardware (such as a hardware security module or HSM).

Application module 213 may include any program, software, or other code suitable to run one or more applications. For example, application module 213 may include a payment application operable to conduct a payment transaction. In some embodiments, the payment application may be configured to allow a user to select goods and services to be purchased, obtain secure credentials (e.g., a cryptogram key) from an issuer of a payment account, and/or initiate or conduct a payment transaction (e.g., using the secure credentials).

It is understood that the components described herein are for illustration purposes only and not intended to be limiting. In various embodiments, more or less components than listed herein may be provided. For example, in an embodiment, the user device 200 may not include a secure element 204. In such an embodiment, sensitive or confidential data (e.g., cryptographic keys) may be stored (e.g., in encrypted form) in and/or retrieved from a storage device 107 that is operably connected to the user device 200. In some embodiments, the user device 200 may not include an application module 213.

C. Server Computer

Figure 3:
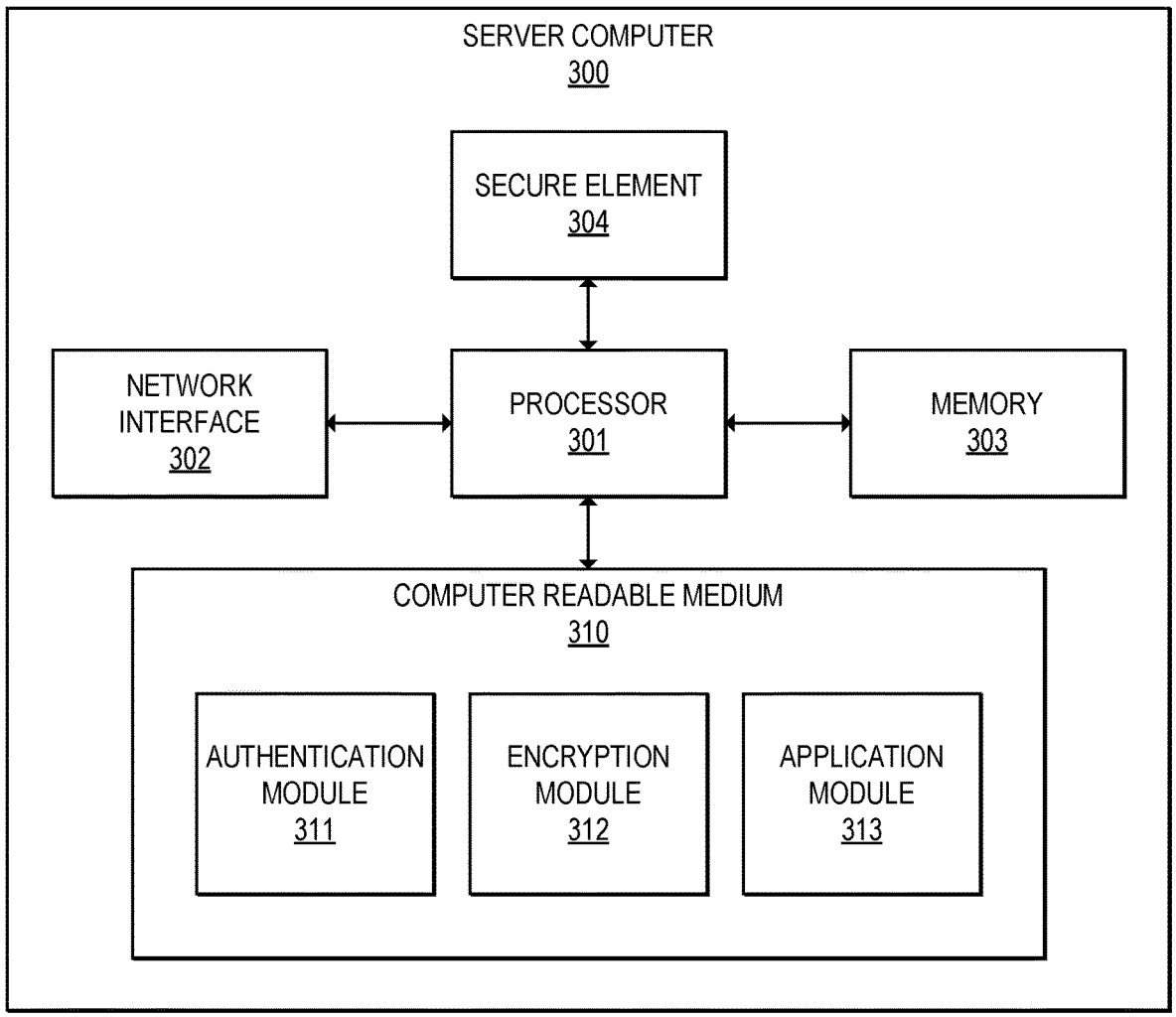
FIG. 3 shows an example of a server computer, in accordance with some embodiments.

FIG. 3 shows an example of a server computer 300, in accordance with some embodiments. For example, the server computer 300 may include or be included in any of the devices 102-106 described in FIG. 1. Examples of server computers 300 may include mobile phones, tablets, desktop and laptop computers, mainframe computers, or any other computing device suitable for receiving, storing, and transmitting data. The server computer 300 can be configured to communicate directly or indirectly with a user device 200 to implement the methods described herein. Server computer 300 may include a processor 301 communicatively coupled to a network interface 302, a memory 303, a computer readable medium 310, and optionally, a secure element 304.

The processor 301, network interface 302, memory 303 may be similar to the processor 201, network interface 202, and memory 203 of the user device 200. The computer-readable medium 310 may be in the form of a memory (e.g., flash, ROM, etc.) and may comprise code, executable by the processor 301 for implementing the methods described herein. The computer readable medium 310 may include an authentication module 311, an encryption module 312, and an application module 313. In various embodiments, such modules may be configured to perform, individually or collectively, some or all of methods 700, 1200, 1400, 1300, 1300, 1900, 11100 of FIGS. 6-7, 9, 11, 13, 15, 17, and 18, respectively.

Authentication module 311 may include any program, software, or other code suitable to authenticate computing device 300 to another computing device, or authenticate another computing device at computing device 300. For example, authentication module 311 may be configured to generate and send an authentication request message to another computing device, and receive and process an authentication response message from the other computing devices. Similarly, authentication module 311 may be configured to receive and process an authentication request message from another computing device, and generate and send an authentication response message to the other computing device.

Encryption module 312 may include any program, software, or other code suitable to perform operations related to encryption and/or decryption. For example encryption module may be configured to generate a shared secret, such as using a key agreement protocol such as Diffie-Hellman. Encryption module 312 may be further configured to derive a session key or storage protection key from a shared secret, such as using a key derivation function (KDF). In some embodiments, encryption module 312 may be configured to store one or more static keys, such as a static user device private key or a static server private key. In some embodiments, encryption module 312 may be implemented using any combination of software (such as host card emulation or HCE) and hardware (such as a hardware security module or HSM).

Application module 313 may include a payment application service operable to service payment applications at one or more computing devices. In some embodiments, the payment application service may be configured to allow a user to select goods and services to be purchased. The application module 313 may also include services for enrolling or re-enrolling user devices and/or conducting transactions with user devices.

It is understood that the components described herein are for illustration purposes only and not intended to be limiting. In various embodiments, more or less components than listed herein may be provided. For example, in an embodiment, the server computer 300 may not include a secure element 304 and/or an application module 313.

While the general term "server computer" is used, in some embodiments, different server computers may be provided to implement different features of the invention. For example, a provisioning server may be configured to establish shared secret(s) with a user device, and provision credentials including token, key derivation parameters, update parameters, cryptogram derivation parameters, transaction parameters, and any other suitable data to a user device. A registration server may be configured to provide a registration data to a user device, receive a registration cryptogram from the user device, and validate a registration cryptogram using the registration data provided by the user device. A validation server may be configured to validate transaction cryptograms provided by a user device using update shared secret that is determined based on a previous shared secret. A renewal server may be configured to establish a new shared secret may be established between the user and the server computer. Additionally, the renewal server may be configured to provision new parameters (e.g., new key derivation parameters, new cryptogram derivation parameters, and/or new update parameters) may be provisioned onto the user device to be used for generating cryptograms and/or cryptogram keys.

In various embodiments, the provisioning server, registration server, and validation server may be implemented by separate server computers or the same server computer. For instance, the validation server may be implemented by a transaction server configured to handle payment requests that is separate from the provisioning server and/or registration server. The provisioning server and the registration server may be the same server or separate servers. The registration server and the renewal server may be the same or separate servers. When implemented by separate server computers, the provisioning server, registration server, renewal server, and/or validation server may communicate with each other so as to access information required to decrypt and/or verify data (e.g., server private keys, shared secrets, key derivation parameters, cryptogram derivation parameters, update parameters, cryptograms, request data, etc.).

II. Methods

Embodiments can use the systems and apparatuses described above to securely provision sensitive data such as credentials from a server computer to a user device. FIGS. 4-10 describe some examples of such methods. In some embodiments, the user device may include the user device 101 or 200 of FIGS. 1 and 2, respectively. The server computer may include the device 102, 103, 104, 105, 106, or 300 of FIGS. 1 and 3, respectively. In some embodiments, the server computer can include a provisioning server computer.

A. High Level Block Diagram

Figure 4:
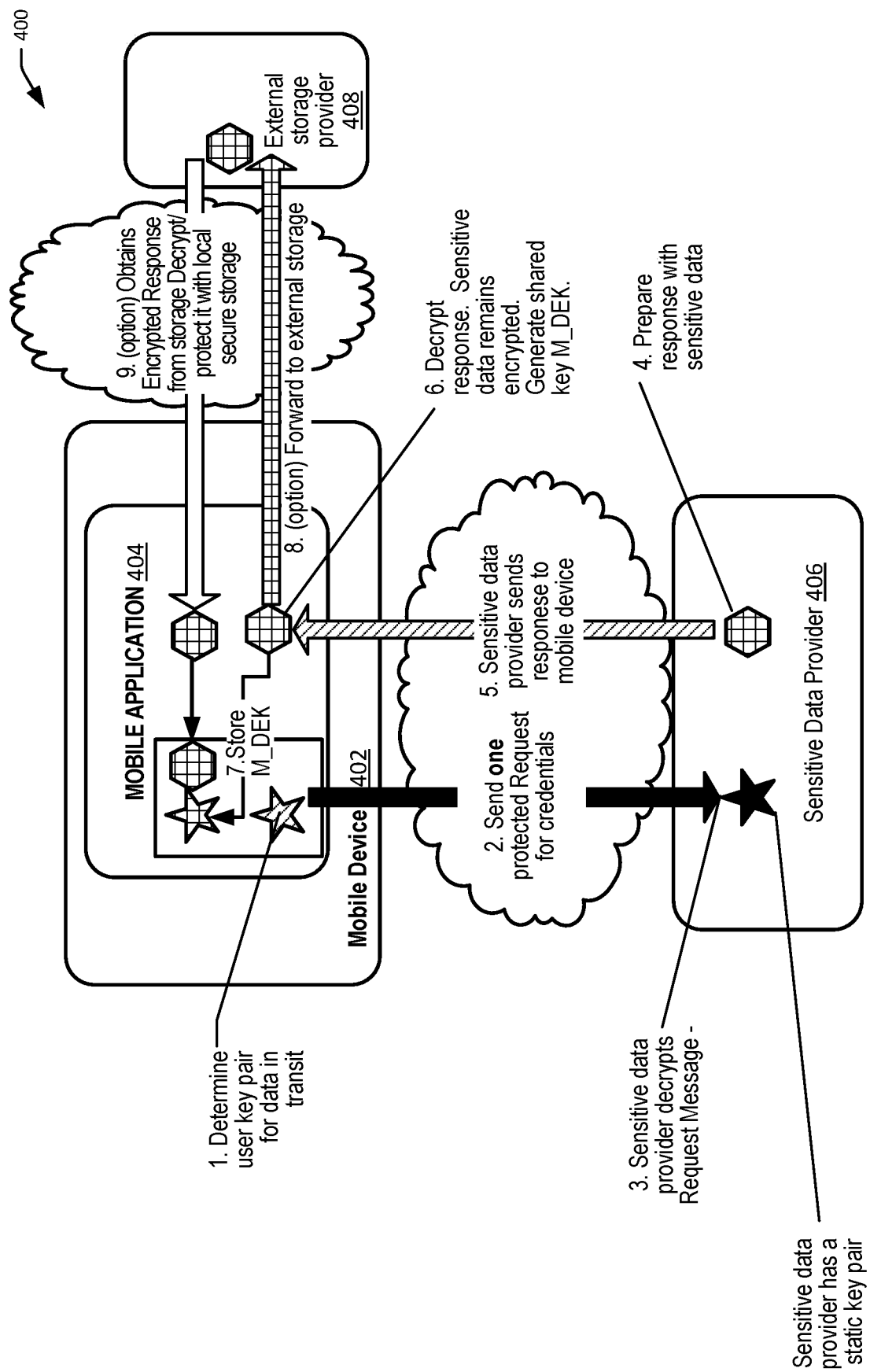
FIG. 4 shows a high-level block diagram of a secure credential provisioning process, in accordance with some embodiments.

FIG. 4 shows a high-level block diagram of a secure credential provisioning process 400, in accordance with some embodiments. The process 400 can be used to provision sensitive data, such as credential data, from a sensitive provider 406 to a mobile device 402. The mobile device 402 can include the user device discussed in FIGS. 1-2. The sensitive provider 406 can include a provisioning server such as a server computer 300, a merchant computer 103, an acquirer computer 104, a payment processing network computer 105, an issuer computer 106, and the like. The mobile device 402 may optionally communicate with an external storage provider 408 for storing and/or retrieving data such as credential data. In some embodiments, some or all functionalities of the mobile device 402 discussed below may be implemented by a mobile application 404 installed on the mobile device 402.

At step 1, the mobile device 402 generates a user key pair to protect data in transit between the mobile device 402 and the sensitive data provider 406. The key pair can be of any suitable format, such as elliptic curve (EC) based keys or RSA based keys. Preferably, the public key and/or the private key of the user key pair are one-time keys. That is, the public key and/or the private key of the user key pair are different for each new provisioning request. In some embodiments, the user key pair can include an ephemeral key pair, which comprises an ephemeral public key and an ephemeral private key. A fresh and different ephemeral key pair may be generated for each new provisioning request. The ephemeral private/public keys can be used directly as one-time keys. Alternatively, the ephemeral private/public keys can be further blinded, obfuscated, or modified as discussed below to form the one-time keys. In some other embodiments, instead of an ephemeral key pair, the user key pair can include a static key pair that stays static (i.e., unchanged) for all provisioning requests or semi-static for a predetermined period of time or a predetermined number of provisioning requests. The static or semi-static keys may be blinded, obfuscated, or otherwise modified (e.g., using a different cryptographic nonce, a random number, device-specific or user specific data, transaction data, etc.) for each provisioning request, so that the resulting blinded keys are one-time keys even though the underlying base keys may be static or semi-static.

At step 2, the mobile device 402 sends a request to the sensitive data provider 406 for credential data. The sensitive data provider 406 typically has a static key pair comprising a static public key and a static private key. The request message can be protected using the user private key (which may be static or ephemeral, blinded or not blinded) and the sensitive data provider public key. For example, the user private key and the provider public key can be used to generate a request session key. The request session key can be used to encrypt some or all portions of the request message. The request message may include the user public key (which may be static or ephemeral, blinded or not blinded).

At step 3, the sensitive data provider 406 decrypts the request message. In some embodiments, the sensitive data provider 406 may decrypt the request message using a request session key that is generated using the sensitive data provider private key corresponding to the sensitive data provider public key and the user public key of the mobile device (which may be provided in the request message and which may or may not be blinded).

At step 4, the sensitive data provider 406 prepares a response with sensitive data such as credential data. As discussed, credentials or credential data can include any information provisioned from the sensitive data provider 406 to the mobile device 402 that enables the mobile device 402 to conduct transactions (e.g., payment transactions). Examples of credential data can include PAN, token, or other account information, one or more cryptographic keys (e.g., LUKs used to generate cryptograms, encryption key, blinded or unblinded static public keys, etc.), key derivation parameters (e.g., for deriving a SUK that is used to generate a cryptogram, a shared secret key, a storage protection key, an encryption key, etc.), cryptogram derivation parameters, certificate chain information, transaction parameters, and any other suitable data.

To enhance security, the sensitive data may be protected using a storage protection key that is different from the session keys. The storage protection key may be used to directly encrypt some or all of the sensitive data or to derive a credential encryption key which is then used to encrypt the sensitive data. The storage protection key can be a symmetric encryption key.

Alternatively, the storage protection key can be an asymmetric key such as a public key. In such cases, the private key corresponding to the public key may be used to decrypt the sensitive data.

At step 5, the sensitive data provider 406 sends a response to the mobile device 402. The response can include encrypted sensitive data. Some or all portions of the response can be protected using a response session key to protect the data in transit. The response session key can be generated using the user public key and the sensitive provider private key. The response can include the sensitive provider public key (which may be blinded) so as to allow the mobile device 402 to decrypt the response. In some cases, the response may not include the sensitive provider public key when the mobile device 402 is able to determine the sensitive provider public key (e.g., from a certificate).

At step 6, the mobile device 402 decrypts the response. For example, the mobile device 402 can generate a response shared secret using the sensitive provider public key and the user private key. A response session key can be generated from the response shared secret and used to decrypt the response. Sensitive data protected by the storage protection key can remain encrypted to avoid exposure of the sensitive data. The storage protection key (M DEK) can be generated by the mobile device 402, for example, using the response shared secret.

At step 7, the storage protection key is stored in the mobile device 402. The storage protection key may be securely stored in the storage. For instance, the storage protection key may be encrypted using a key encryption key (KEK) of the mobile device. Alternatively, the storage protection key may be stored in a tamper-resistant secure module of the mobile device, or protected using white-box cryptography, or any other suitable techniques. In some embodiments, the storage protection key is used as an input to an optional key derivation function, along with some derivation data specific to the mobile device (e.g., device fingerprint) to derive a device-specific credential encryption key. The device-specific credential encryption key can be stored at the mobile devices instead of or in addition to the storage protection key.

Like the storage protection key, the encrypted sensitive data that has been encrypted using the storage protection key (or a credential encryption key derived from the storage protection key) can also be stored on the mobile device 402. In some embodiments, the encrypted sensitive data can be stored in a secure element of the mobile device (e.g., a tamper resistant security module). In other embodiments, the encrypted sensitive data can be stored on a mobile device without a secure element. Because the sensitive data stay encrypted when in storage, the risk of exposure of the sensitive data is minimized even when the storage device is compromised.

In some embodiments, the storage protection key and the encrypted sensitive data may be stored in the same or different storage locations. For instance, the storage protection key (e.g., in an encrypted form) and the encrypted sensitive data may both be stored in a non-secure element of the mobile device (e.g., when the mobile device does not have a secure element). In another example, the storage protection key (e.g., in an encrypted or unencrypted form) may be stored in a secure element of the mobile device, whereas the encrypted sensitive data may be stored in a regular storage element (since the sensitive data is already encrypted).

At step 8, the mobile device 402 can optionally forward the encrypted sensitive data to be stored by an external storage provider 408. The storage of the encrypted sensitive data at the external storage provider may be useful for backup purposes. For instance, a copy of the encrypted sensitive data may be stored at both the mobile device and another device (e.g., a personal computer or desktop). The storage of the encrypted sensitive data at the external storage provider may also be used to reduce the risk of exposure of the encrypted sensitive data at the mobile device. For example, the external storage provider may provide a higher level of data security (e.g., via secure hardware and/or software protection) than the mobile device. A copy of the encrypted sensitive data may be stored only at the external storage provider and not at the mobile device, which is considered less secure. In some cases, the storage protection key and the encrypted sensitive data can be stored at different locations, so as to minimize the risk of exposure of the sensitive data. An attacker would not be able to decrypt the encrypted sensitive data without the storage protection key and vice versa. Even with both the storage protection key and the encrypted sensitive data, an attacker may not be able to decrypt the encrypted sensitive data. For example, in some embodiments, the storage protection key cannot be used to directly encrypt the encrypted sensitive data. Instead, the storage protection key needs to be combined with additional information unknown to the attacker (e.g., device-specific data) to derive an encryption key for decrypting the encrypted sensitive data.

The external storage provider 408 may be operated by or associated with a merchant computer 103, an acquirer computer 104, a payment processing network 105, an issuer computer 106, or any other suitable entities (e.g., a cloud-based storage provider). In an example, the external storage provider is or is associated with the same entity (e.g., a user) that also owns or operates the mobile device. In some other embodiments, the external storage provider 408 can include a storage device 107 that is connected to the mobile device (e.g., an external hard drive). The external storage provider 408 can be remotely connected to the mobile device via one or more networks (e.g., wired or wireless networks). Alternatively, the external storage provider 408 can be locally connected to the mobile device without using a network.

At step 9, the mobile device 402 can optionally obtain the encrypted sensitive data from the external storage provider 408. For example, the mobile device 402 may authenticate to the external storage provider 408 (e.g., using a username and password), and the external storage provider 408 may return the encrypted sensitive data in response. The mobile device 402 can then decrypt the encrypted sensitive data, so that the decrypted sensitive data (e.g., credential data) can be used to conduct a transaction. For example, the encrypted sensitive data may be decrypted using the storage protection key to obtain the cryptographic material (e.g., an LUK) for generating a cryptogram. The cryptogram may be used in an authorization/authentication request of a transaction. Alternatively or additionally, the mobile device 402 can store the encrypted sensitive data in secure local storage (e.g., secure element 204) or otherwise protect the encrypted sensitive data in storage of the mobile device. For instance, the decrypted sensitive data may be re-encrypted using a secret encryption key of the mobile device (instead of or in addition to the storage protection key) before being stored at the mobile device.

In various embodiments, the sensitive data remains encrypted at the provisioning time, from the sensitive data provider 406 to the mobile device 402, during transmit between the mobile device 402 and the external storage provider 408, as well as during storage at the mobile device 402 and/or external storage provider 408. Thus, end-to-end protection of the sensitive data is provided until the actual use of the sensitive data at transaction time, limiting exposure of the sensitive data to only when the sensitive data is required, thereby reducing the risk of compromise of the sensitive data.

B. User Device

Figure 5:
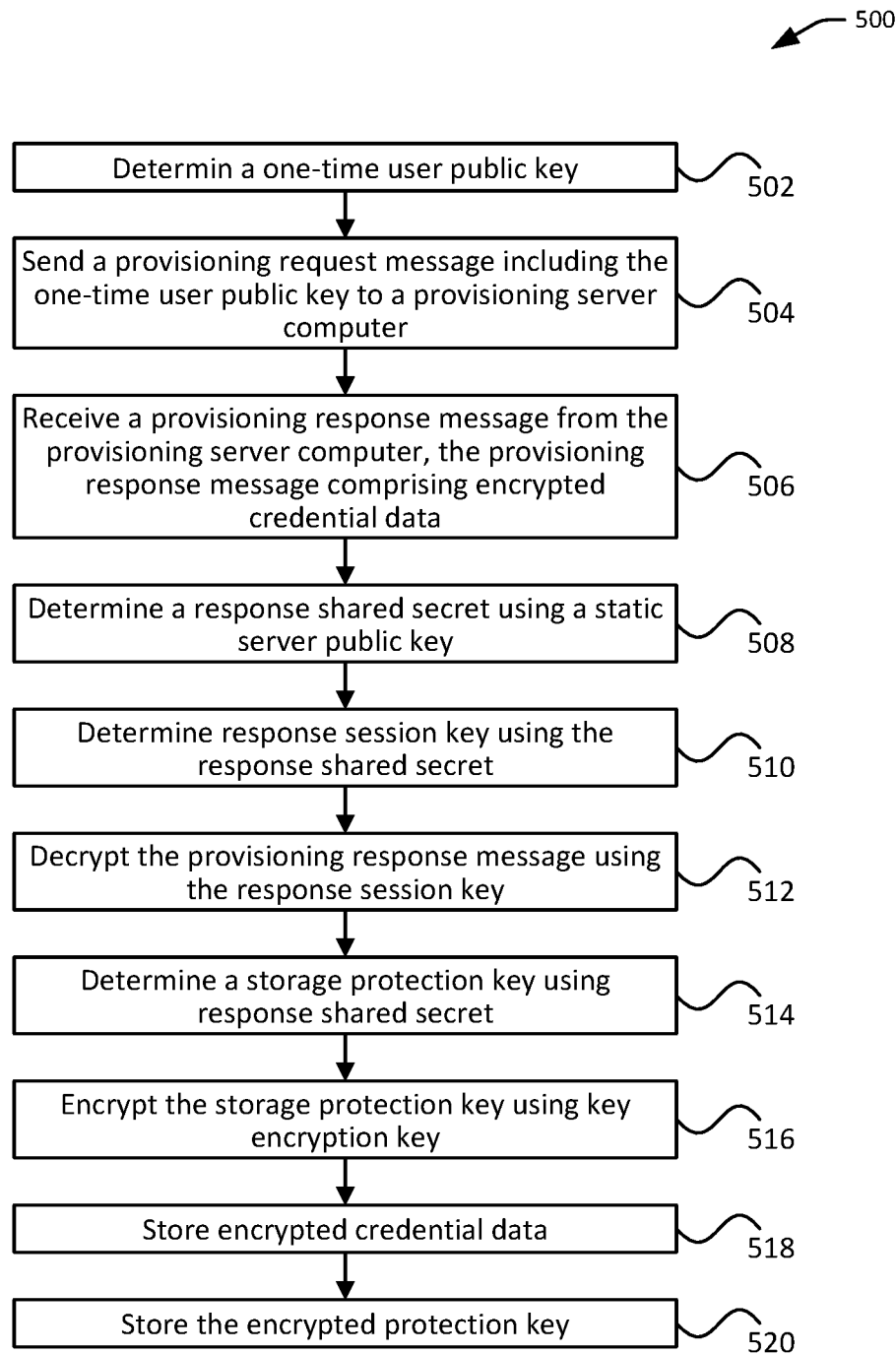
FIG. 5 shows an example process for securely provisioning credential data from a server computer, in accordance with some embodiments.

FIG. 5 shows an example process 500 for securely provisioning credential data from a server computer, in accordance with some embodiments. In such embodiments, the credential data can be protected by a storage protection key that is determined based on a shared secret. Aspects of the process 500 may be performed by a user device such as a user device 101 or 200. Alternatively or additionally, aspects of the process 500 may be performed by any other suitable entities. Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. The order in which the operations are described is not intended to be construed as a limitation, and any number of the described operations may be combined in any order and/or in parallel to implement the processes.

At block 502, a one-time user public key is determined. The one-time user public key is a public key associated with the user device and can also be referred to as one-time client public key. The one-time user public key can be a part of a user key pair comprising the public key and a corresponding private key. The key pair can be of any suitable format, such as elliptic curve (EC) based keys or RSA based keys. The user key pair can include an ephemeral key pair that is generated for each provisioning request. Alternatively, the user key pair can include a static key pair that remain the same for all the provisioning requests, or a semi-static key pair that remain static for a predetermined period of time or a predetermined number of provisioning requests. The values of the static or semi-static keys may be blinded, obfuscated, or otherwise modified differently for each provisioning request, resulting in one-time keys. For instance, point multiplication may be performed on a user public/private key with some other data element (e.g., a random number, a cryptographic nonce, identification factor, transaction data, etc.) to modify the value of the user key for each provisioning request. In some embodiments, the private key of the user key pair may remain static while the public key of the user key pair changes with every provisioning request. In other cases, both the private and public keys of the user pair may be modified for each provisioning request.

In some embodiments, an identification factor is calculated using identification data and authentication data. Identification data may include any data or information associated with a user or a user device. Examples of identification data may include a name of a user associated with user device, an organization associated with user device, payment information such as a primary account number (PAN) or token associated with user device, an expiration date associated with the PAN or token, a certificate associated with user device, an IMEI or serial number of user device, etc. Authentication data may include any data or information suitable to authenticate a user or user device. Examples of authentication data may include a password or passphrase, a secret key (e.g., a private key), etc. An identification factor may include any data or information determined from identification data and/or authentication data. For example, in some embodiments, the identification factor may be generated by hashing a combination of the identification data and the authentication data.

The identification factor can be combined with the user public key (which may be ephemeral, static, or semi-static) and the user private key (which may be ephemeral, static, or semi-static). As a result, a combined or blinded ephemeral public key and a combined or blinded ephemeral private key may be determined. A combined or blinded key may include a key that has been obfuscated or otherwise modified from its original value by combination with another data element or value, as discussed above. In some embodiments, the blinding of the user keys may be optional (e.g., when ephemeral keys are used).

A request shared secret can be generated using the user private key (which may or may not be blinded or combined with other data elements) and a static server public key. The request shared secret can be used to protect (e.g., encrypt and/or decrypt) the provisioning request message as discussed below. The static server public key may include a static public key maintained by server computer, such as in a secure element. In some embodiments, the static server public key may be determined from a digital certificate of server computer, which may have been previously obtained by user device, and which may be signed by a trusted certificate authority.

The request shared secret may be generated from the user private key (which may or may not be a combined or blinded key) and the static server public key using any suitable method. For example, in embodiments using elliptic curve cryptography, the shared secret may be determined using the elliptic-curve Diffie-Hellman protocol (ECDH).

A request session key can be generated using the request shared secret and other suitable supplementary data such as key derivation data, if any. The request session key can also be referred to as a message protection key since it is used to protect a message between the user device and the server computer. Examples of such supplementary data may include a server computer identifier and/or a truncated one-time user public key.

The request session key may be of any suitable format (e.g., AES, DES, Blowfish, etc.), of any suitable length, and generated using any suitable key derivation function (KDF). For example, in one embodiment, the request session key may be generated using the Password-Based Key Derivation Function 2 (PBKDF2) algorithm. In some embodiments, other user device data, such as a user device identifier, may be used as additional inputs to the key derivation function.

At block 504, a provisioning request message is sent to a provisioning server computer. In some embodiments, the provisioning request message may pass through one or more intermediaries (e.g., untrusted network) before reaching server computer. The request message can include the one-time user public key (blinded or not blinded). The request message can also include identification data, a user device identifier, authentication data, along with any other suitable data intended for the server computer. For example, the request data can also include client configuration information and/or directives for the service. In some examples, such information can be provided by user devices that do not a priori include means for strong authentication. Some or all of the request data (data contained in the request message) may be protected (e.g., encrypted) using the request session key to form an encrypted request message. An example provisioning request message is shown in FIG. 12. In an example, the identification data and the authentication data are encrypted and stored in a cipher text portion of the request message. The one-time user public key may be stored in a clear text portion of the request message. In another example, the one-time user public key may also be encrypted and stored in the cipher text portion. In some cases, the provisioning request message may include the user public key and not include the encrypted request data.

At block 506, a provisioning response message is received from the provisioning server computer. The provisioning response message may include a blinded static server public key and encrypted response data. Typically, the blinded static server public key may be a blinded form of the static server public key used to generate the request shared secret. The advantage of providing a blinded static server public key is that the static server computer public key is obfuscated and the identity of the server computer protected against eavesdropping. Where the static server public key is not blinded, a cryptographic nonce may be provided as part of the response data and used to compute cryptograms. For instance, the cryptographic nonce from the server (entropy) can be used or stored for further derivation or a second cryptographic nonce can be provided as part of the derivation parameters. It is essential that entropy from the server is used in the computation of the cryptograms (e.g., payment transaction cryptograms). An example provisioning response message is shown in FIG. 12.

At block 508, a response shared secret is determined using the static server public key. The response shared secret may have been used to protect (e.g., encrypt and/or decrypt) the response message. Additionally, in some embodiments, the response shared secret may be used to derive the storage protection key used for protecting sensitive data (e.g., credential data) included in the response. The response shared secret can be determined using the user private key (which may be ephemeral, static, or semi-static) and the static server public key. In some embodiments, a blinded static server public key can be received from server computer, for example, as part of the provisioning response message or from a separate channel. In some other embodiments, the blinding data (e.g., a cryptographic nonce, a random number) may be provided to the user device (e.g., as part of the provisioning response message) instead of the blinded static server public key. In such cases, the blinded static server public key may be derived by the user device using the static server public key and the provided blinding data. For instance, a blinded key may be derived using a cryptographic nonce that may be provided as part of the provisioning response message. The cryptographic nonce can be a random or pseudorandom number. The cryptographic nonce can also be used to verify a server computer certificate, as discussed elsewhere.

In some embodiments, the response shared secret may be generated from the user private key and the blinded static server public key using any suitable method, such as ECDH. In other embodiments, the response shared secret may be determined without a blinded key. In such embodiments, provisioning response message (e.g., the credentials) may include blinding data (e.g., a cryptographic nonce) that can be used to derive a cryptogram key.

Typically, the request shared secret is different from the response shared secret. For example, the static server public key may be blinded differently when used to generate the request shared secret and response shared secret. In some embodiments, the request shared secret may be substantially the same as the request shared secret.

At block 510, a response session key is determined using the response shared secret and other suitable supplementary data such as key derivation data, if any. The response session key can also be referred to as a message protection key since it is used to protect a message between the user device and the server computer. Examples of such supplementary data may include a server computer identifier, a user device identifier, and/or a truncated user public key. The second session key may be generated using any suitable KDF.

The response session key may be of any suitable format (e.g., AES, DES, Blowfish, etc.), of any suitable length, and generated using any suitable key derivation function (KDF). For example, in one embodiment, the response session key may be generated using the Password-Based Key Derivation Function 2 (PBKDF2) algorithm. In some embodiments, other user device specific data, such as a user device identifier or other device fingerprint information, may be used as additional inputs to the key derivation function.

At block 512, the provisioning response message is decrypted using the response session key to obtain response data. The response data can include encrypted credential data, a cryptographic nonce, a server computer certificate chain, key derivation data, cipher suite descriptors, and any other data. Some or all of the response data may be have been encrypted using the response session key.

Authentication of the server computer can be performed by the user device. The server computer certificate chain can be validated. The server computer certificate chain may be validated using any suitable online or offline method. For example, for each of the one or more certificates in the chain, the digital signature of the certificate can be validated using a known trusted public key (e.g., a certificate authority's public key, or a public key of an entity appropriately authorized by the CA). For example, in some embodiments, a digital signature algorithm, such as the elliptic curve digital signature algorithm (ECDSA) may be used to validate a certificate. In some embodiments, a server computer certificate may be verified using a cryptographic nonce that is provided as part of the provisioning response message (e.g., as part of the credentials).

The blinded static server computer public key can be verified using the server computer certificate and the cryptographic nonce. Verifying the blinded static server computer public key may include ensuring that the blinded static server computer public key matches an expected value. For example, in some cases, a second blinded static server computer public key may be generated using the static server computer public key included on the server computer certificate, and a cryptographic nonce extracted from the response data. The second blinded static server computer public key may then be compared to the received blinded static server computer public key to ensure that the keys match. Alternatively, in some cases, the received blinded static server computer public key may be verified by comparing it to a stored blinded static server computer public key. If the keys match, server computer may be authenticated. Otherwise, authentication may fail. In some embodiments, the blinded static public key can be provided both in the clear text and in the cipher text of the response message so as to enable verification and prevent tampering.

It should be noted that this method of authentication (i.e., verifying a blinded static public key) can provide the advantage that the static server computer public key, which may be considered sensitive (as it may reveal the identity of the server computer), does not need to be transmitted in clear text. Thus, authentication of server computer can be performed while protecting the identity of server computer from an eavesdropper that captures the provisioning request message.

The response data can also include encrypted credential data, which can stay encrypted without being decrypted until the credential data is actually needed to conduct a transaction. The credential data may include any data that is provisioned from a server to a user device (e.g., mobile device) that enables the user device to conduct transactions (e.g., payment transactions). Examples of credential data can include tokens, PAN, or other account information, one or more keys (e.g., LUKs used to generate cryptograms, encryption key, blinded or unblended static public keys, etc.), key derivation parameters (e.g., for deriving a SUK that is used to generate a cryptogram, a shared secret key, an encryption key, etc.), cryptogram derivation parameters, certificate chain information, transaction parameters, and any other suitable data.

The credential data may include key derivation parameters that may or may not include a limited use key (LUK). The key derivation parameters (which may or may not include the LUK) may be used to generate one or more cryptograms for conducting transactions. For instance, the LUK may be used to derive a cryptogram directly or used to derive a cryptogram key that is then used to generate a cryptogram.

The credential data may include cryptogram derivation parameters may be used to derive cryptograms. The credential data may also include update parameters that may be used by the user device to generate an updated shared secret based on a previous shared secret. In some embodiments, the key derivation parameters may be substantially the same as the update parameters. In some other embodiments, the key derivation parameters may be different than the update parameters. The key derivation parameters and/or the update parameters may be unique per user device or per group of user devices so as to prevent mass offline attacks.

The key derivation parameters, the cryptogram derivation parameters, and/or the update parameters may include a LUK, a specification of which transaction parameters from a given transaction to use, code for performing the derivation (or an identifier of which derivation procedure to use) and/or other information related to these parameters. In some embodiments, the key derivation parameters, cryptogram derivation parameters, and/or the update parameters may include "dummy" or invalid parameters for obfuscation purposes. The code can be personalized derivation method code in that it is unique to a device or group of devices, and may be assigned randomly. The code can be signed by the server or other vendor, so that the user device can authenticate the code. In some embodiments, the code is obfuscated before being signed, thus making it difficult for an attacker to understand, bypass, and/or reverse engineer the code.

At block 514, a storage protection key is determined using the response shared secret. The storage protection key can be useful for decrypting encrypted credential data. For instance, the storage protection key may have been used, by the server computer, to directly encrypt the credential data to generate the encrypted credential data. As another example, the storage protection key may have been used, in combination with data specific to the user device or user (e.g., device fingerprint information or user identification information), to derive a credential encryption key was used to encrypt the credential data.

Various methods can be used to generate the storage protection key. In one embodiment, the response shared secret can be used to derive a random or pseudorandom bit string. The bit string can be split, according to a predetermined algorithm, into two portions. The first portion of the bit string may be used as or used to generate the response session key; whereas the second portion of the bit string may be used as or used to generate the storage protection key.

In another embodiment, the response shared secret can be used with different key derivation functions or key generation algorithms to generate the response session key and the storage protection key, respectively.

In some alternative embodiments, the storage protection key may not be generated from the response shared secret at all. As discussed in connection with FIG. 13, instead of a shared secret key, the storage protection key can be a public key of the user device and corresponds to a storage private key. The storage private key may be the same as or different from the user private key discussed in block 502, which is used as a one-time user public key and provided to the server computer (e.g., in the provisioning request message) for the purpose of generating shared secrets (e.g., request shared secret and response shared secret).

The storage protection public key may be provided to the server computer (e.g., in the provisioning request message) for protecting credential data. The server computer may encrypt the credential data with the storage protection key and provide the encrypted credential data to the user device. In such an embodiment, the user device may store the encrypted credential data until the credential data is needed to conduct a transaction (e.g., to generate a transaction cryptogram). At transaction time, the user device may decrypt the encrypted credential data using the storage protection private key corresponding to the storage protection public key. The storage protection private key may be protected by the user device (e.g., via encryption, white-box cryptography, or secure hardware module).

At block 516, the storage protection key can optionally be encrypted using a key encryption key (KEK). The KEK can include any suitable encryption key of the user device. In some cases, the KEK may be static or changing over time. For instance, the storage protection key may be re-encrypted periodically with rotating KEKs to enhance security. In some embodiments, instead of or in addition to being encrypted with an encryption key, the storage protection key may be protected using any other suitable methods including secure tamper-resistant hardware module (e.g., smart chip), white-box cryptography, and the like. In embodiments where the storage protection key is a public key, the corresponding storage protection private key (usable for decrypting the encrypted credential data) may be encrypted or otherwise protected (e.g., using secure hardware module or white-box cryptography).

At block 518, the encrypted credential data is stored. The encrypted credential data may be stored on the user device, e.g., in a secure or non-secure module. Alternatively or additionally, the encrypted credential data may be stored at a remote or local data storage such as provided by an external storage provider discussed in FIG. 4. In some instances, one or more copies of the encrypted credential data can be stored by one or more external storage, for example, to provide redundancy. However, the encrypted credential data cannot be decrypted without the storage protection key which is protected by encryption or other suitable data protection methods, thereby reducing the risk of compromise of the credential data.

At block 520, the encrypted protection key is stored. The encrypted storage key may be stored on the user device, e.g., in a secure or non-secure module. Alternatively or additionally, the encrypted storage key may be stored at a remote or local data storage such as provided by an external storage provider discussed in FIG. 4. In embodiments where the storage protection key is a user public key, the corresponding storage protection private key (usable for decrypting the encrypted credential data) may be encrypted or otherwise protected (e.g., using secure hardware module or white-box cryptography). In some embodiments, the encrypted protection key and the encrypted credential data may be stored at different locations to reduce the risk of compromise of both.

For example, the encrypted protection key can be stored at the user device and the encrypted credential data can be stored at an external storage provider that is remotely connected to the user device; or vice versa.

Figure 6:
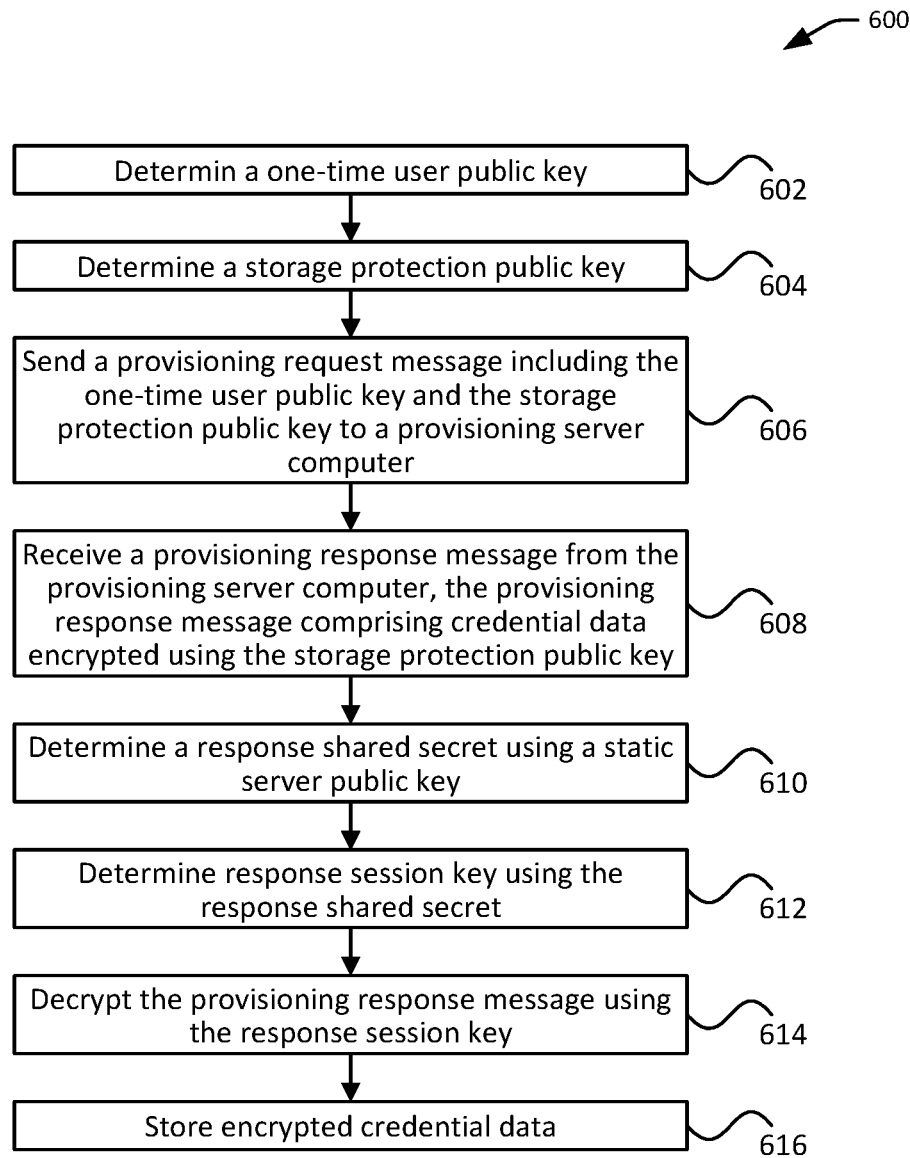
FIG. 6 shows another example process for securely provisioning credential data from a server computer, in accordance with some embodiments.

FIG. 6 shows another example process 600 for securely provisioning credential data from a server computer, in accordance with some embodiments. In such embodiments, the credential data can be protected by a storage protection public key that is provided by the user device. Aspects of the process 600 may be performed by a user device such as a user device 101 or 200. Alternatively or additionally, aspects of the process 600 may be performed by any other suitable entities.

At block 602, a one-time user public key is determined. The one-time user public key can be similar to the one-time user public key that is generated at block 502 of FIG. 5 discussed above.

At block 604, a storage protection public key is determined. The storage protection public key can be a public key of a public/private storage protection key pair generated and/or maintained by the user device. The storage protection private key can be used to decrypt the encrypted sensitive data (e.g., credential data). The storage protection key pair may be a different key pair than the user public/private key pair used in block 602 used to generate the shared secrets (e.g., request shared secret and response shared secret). Alternatively, the storage protection key pair and the user key pair may share the same private key. For instance, the same user private key can be used to generate two public keys, a storage protection public key for the purpose of protecting credential data and a user public key discussed in block 602 used for the purpose of protecting messages in transit.

At block 606, a provisioning request message is sent to a provisioning server computer. The request message can include the one-time user public key (blinded or not blinded) and the storage protection public key. The request message can be also include other data described in FIG. 5 such as identification data, a user device identifier, authentication data, along with any other suitable data intended for the server computer. In some embodiments, a request shared secret and a request session key can be determined in a similar manner as described in FIG. 5. The request session key can be used to protect the provisioning request message. An example provisioning request message is shown in FIG. 13.

At block 608, a provisioning response message is received from the provisioning server computer. The provisioning response message may include credential data that has been encrypted using the storage protection public key that was sent in block 606 above. The provisioning response message may also include a blinded static server public key and other encrypted response data such as described in block 506 of FIG. 5. An example provisioning response message is shown in FIG. 13.

At block 610, a response shared secret is determined using the static server public key. The response shared secret may be determined in a similar manner as described in block 508 of FIG. 5.

At block 612, a response session key is determined using the response shared secret and other suitable supplementary data such as key derivation data, if any. The response session key may be determined in a similar manner as described in block 510 of FIG. 5.

At block 614, the provisioning response message is decrypted using the response session key to obtain response data. The provisioning response message may be decrypted in a similar manner as described in block 512 of FIG. 5. The response data can include encrypted credential data. The encrypted credential data may have been encrypted using the storage protection public key that was provided in block 606 above. Additional authentication steps may be performed by the user device based on the response data as described in FIG. 5.

At block 616, the encrypted credential data is stored in a similar manner as described in block 518 of FIG. 5.

The storage protection private key that is used to decrypt the encrypted credential data and/or the storage protection public key may be stored in a similar manner as described in blocks 518 and 520 of FIG. 5. For instance, the storage protection private/public key may be further encrypted using a key encryption key before being stored. The storage protection private/public key may be stored in a secure module (e.g., smart chip card). The storage protection private/public key may be stored locally on the user device or at a remote storage provider. In some embodiments, the storage protection private/public key and the encrypted credential data may be stored at different locations to reduce the risk of compromise of the credential data.

Figure 7:
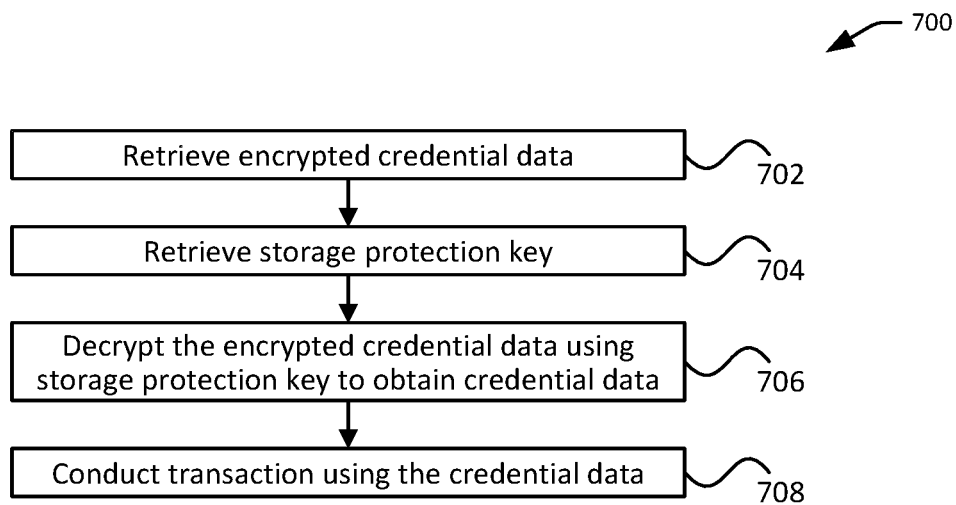
FIG. 7 shows an example process for using the credential data to conduct transactions, in accordance with some embodiments.

FIG. 7 shows an example process 700 for using the credential data to conduct transactions, in accordance with some embodiments. In some embodiments, the process 700 can be used by a user device to utilize the encrypted credential data obtained using the provisioning process 500 described in FIG. 5. Aspects of the process 700 may be performed by a user device such as a user device 101 or 200. Alternatively or additionally, aspects of the process 700 may be performed by any other suitable entities.

At block 702, the encrypted credential data is retrieved. The encrypted credential data may be retrieved from a user device that received the provisioning response message or an external storage operably connected to the user device, such as discussed above. For example, the encrypted credential data may be retrieved from a secure module such as a smart chip card. The encrypted credential data may be retrieved in response to an indication that the credential data is needed to conduct a transaction. For instance, the indication may indicate that an authentication or authorization request message is to be generated. Specifically, the indication may indicate that a cryptogram used for authenticating an authorization request message needs to be generated using the credential data. The indication may be received from a mobile application (e.g., payment application) running on a user device indicating a payment transaction is to be initiated. The indication may be received from a user interacting with the mobile application (e.g., via a touchscreen, keyboard, keypad, mouse, voice, gesture, or other suitable user input methods). The indication may be received from a merchant computer or other transaction processing entities (e.g., an acquirer computer, a payment processing network computer, an issuer computer, etc.) in communication with a user device.

At block 704, the storage protection key is retrieved. The storage protection key may be retrieved from a user device that received the provisioning response message or an external storage operably connected to the user device, such as discussed above. For example, the storage protection key may be retrieved from a secure module such as a smart chip card. If the storage protection key was encrypted (e.g., using a KEK) before being stored, the storage protection key may be decrypted.

At block 706, the encrypted credential data is decrypted using the storage protection key to obtain the credential data. In some embodiments, where the storage protection key was used to encrypt the credential data, the storage protection key can be used to directly decrypt the encrypted credential data. In some other embodiments, the storage protection key may be used to derive a data encryption key (or credential encryption key) using some data specific to the user device (e.g., device fingerprint information such as device identifier, hardware or software settings, etc.). The data encryption key can then be used to decrypt the encrypted credential data.

At block 708, credential data is used to conduct transactions. For instance, the credential data can include a LUK or derivation parameters for deriving a SUK. The LUK or SUK may be used to generate a cryptogram key using updated shared secret and key derivation parameters. The key derivation parameters can include key derivation data and/or key derivation algorithms indicated in previous response messages from the server computer (e.g., provisioning response message or authentication response message). For example, LUK or SUK and/or the shared secret may be provided as input into a key derivation function, along with certain key derivation data to produce the cryptogram key. As another example, the LUK or SUK may be used as the cryptogram key. In some embodiments, the cryptogram key may be a single use key that is only valid for one single transaction. In other embodiments, the cryptogram key may be used repeatedly for more than one transaction.

In some embodiments, the cryptogram is further generated using transaction data based on cryptogram derivation parameters that may be sent as part of the provisioning response. In some embodiments, the cryptogram can also include transaction data (e.g., transaction amount, transaction date, etc.) and user/account details (e.g., a payment token, account expiration date, etc.) that are encrypted using the cryptogram key.

The generated cryptogram can be used to conduct a transaction (or other secure communication). Generally, a transaction cryptogram authenticates a transaction. For example, in some embodiments, user device may provide a payment token or PAN and transaction cryptogram to an access device or merchant computer, which may then generate an authorization or authentication request message for the transaction. The authorization or authentication request message can include the transaction cryptogram. The transaction cryptogram can be verified by an entity receiving the authorization or authentication request message (e.g., a payment processing network computer 105, an issuer computer 106, a validation server) in order to determine whether to approve or deny the transaction.

In some embodiments, subsequent to the use of the credential data to conduct a transaction, the credential data may be re-encrypted with a suitable encryption key that may or may not be the storage protection key. For instance, the credential data may be encrypted with a secret or private key of the user device. Data security may be further improved by updating the encryption key (e.g., periodically) and hence re-encrypting the credential data with the updated encryption key.

Figure 8:
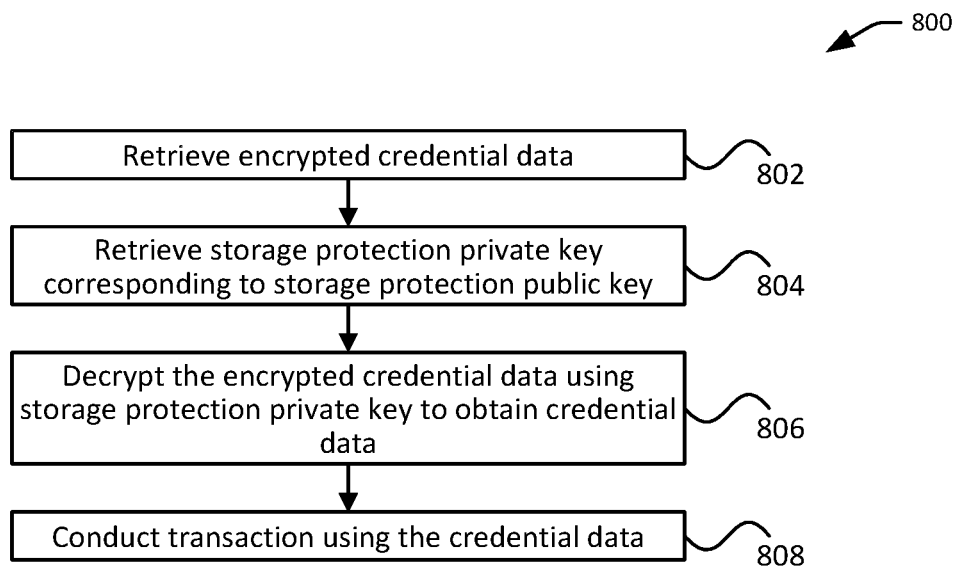
FIG. 8 shows another example process for using the credential data to conduct transactions, in accordance with some embodiments.

FIG. 8 shows another example process 800 for using the credential data to conduct transactions, in accordance with some embodiments. In some embodiments, the process 800 can be used by a user device to utilize the encrypted credential data obtained using the provisioning process 600 described in FIG. 6. Aspects of the process 800 may be performed by a user device such as a user device 101 or 200. Alternatively or additionally, aspects of the process 800 may be performed by any other suitable entities.

At block 802, the encrypted credential data is retrieved. The encrypted credential data may be retrieved in a similar manner as described in block 702 of FIG. 7.

At block 804, the storage protection private key is retrieved. The storage protection private key can correspond to the storage protection public key that was used to encrypt the credential data. In some embodiments, the storage protection public key may be retrieved first and used to retrieve the corresponding storage protection private key. In some cases, the storage protection private key may be encrypted during storage (e.g., using a KEK) and therefore need to be decrypted before being used to decrypt the encrypted credential data. The storage protection private key may be retrieved from the user device or an external storage provider.

At block 806, the encrypted credential data is decrypted using the storage protection private key to obtain the credential data. In some embodiments, where the storage protection public key was used to directly encrypt the credential data, the storage protection private key can be used to directly decrypt the encrypted credential data. In some other embodiments, the storage protection public key may have been used to derive a data encryption key (or credential encryption key) using some data specific to the user device (e.g., device fingerprint information such as device identifier, hardware or software settings, etc.). The data encryption key was then used to encrypt the credential data. In such embodiments, the storage protection private key may be used to, in conjunction with the user/device specific data to derive a data decryption key, which is then used to decrypt the encrypted credential data.

At block 808, credential data is used to conduct transactions in a similar manner as described in block 708 of FIG. 7.

C. Server Computer

Figure 9:
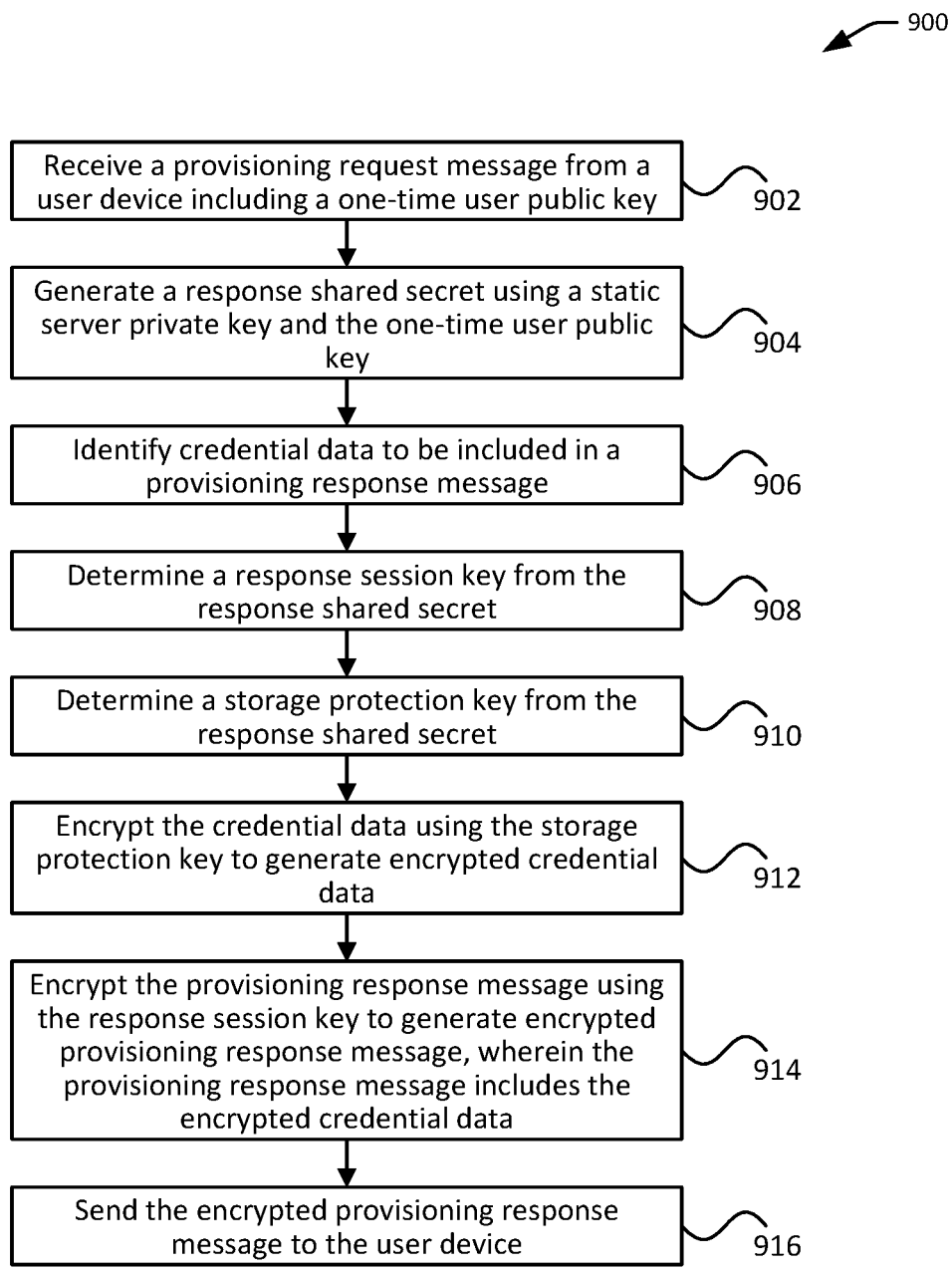
FIG. 9 show an example process for securely provisioning credential to a user device, in accordance with some embodiments.

FIG. 9 show an example process 900 for securely provisioning credential data to a user device, in accordance with some embodiments. In such embodiments, the credential data can be protected by a storage protection key that is determined based on a shared secret. Aspects of the process 900 may be performed by a server computer such as a server device or computer 102, 103, 104, 105, 106, or 300. For instance, the process 900 may be performed by a provisioning server. Alternatively or additionally, aspects of the process 900 may be performed by any other suitable entities.

Typically, before method 900, server computer maintains a static server key pair. The static server key pair may include a public key (i.e., a "static server public key") and a private key (i.e., a "static server private key"). Server computer may also comprise a "server computer certificate" including the static server public key. The server computer certificate may be signed by a certificate authority, such as payment processing network 105 or issuer computer 106.

At block 902, a provisioning request message is received from a user device. The provision request message includes a one-time user public key such as discussed in block 502 of FIG. 5. An example provisioning request message is shown in FIG. 12. In an embodiment, one-time user public key may be generated by the user device using an ephemeral public key or a static or semi-static public key with blinding data such as an identification factor. In another example, the one-time public key may be just the ephemeral public key, without any use of blinding data. In some cases, the provisioning request message may include the one-time user public key, but not the encrypted request data. In such implementations, certain steps below may not be needed, as will be understood by one skilled in the art.

To decrypt the encrypted request data, a request shared secret can be generated using the one-time user public key received above and a static server private key. The request shared secret may be generated using any suitable method, such as ECDH.

A request session key can be generated using the request shared secret and supplementary data such as key derivation data, if needed. Typically, the same supplementary data used to generate the request session key at the user device may be used here.

The encrypted request data can be decrypted using the request session key to obtain the request data. The request data include the identification data, a user device identifier, authentication data, along with any other suitable data intended for the server computer. For example, the request data can also include client configuration information and/or directives for the service. In some cases, the request data also includes the one-time user public key. The user device identifier may include any data suitable to identify user device. Identification data may include any data or information associated with a user or user device. Examples of identification data may include a name of a user associated with user device, an organization associated with user device, payment information such as a primary account number (PAN) or token associated with user device, an expiration date associated with the PAN or token, a certificate associated with user device, an IMEI or serial number of user device, etc.

The user device can be authenticated or verified using the request data. The identification data can be verified using the user device identifier. For example, in some embodiments, the user device identifier may be used to retrieve corresponding identification data from a device database. The decrypted identification data can then be verified by comparison to the received identification data. In some embodiments, the identification data can include the user device identifier.

Authentication data associated with the user device identifier and/or the identification data can be retrieved. Authentication data may include any data or information suitable to authenticate a user or user device. Examples of authentication data may include a password or passphrase, a secret key (e.g., a private key), etc. In some embodiments, the authentication data can be retrieved from a device database.

An identification factor can be generated using the retrieved authentication data and the identification data. An identification factor may include any data or information determined from identification data and/or authentication data. For example, in some embodiments, the identification factor may be generated by hashing a combination of the identification data and the authentication data.

The one-time user public key can be verified to ensure that the one-time user public key matches an expected value. For example, in some cases, a blinded one-time public key may be generated using a one-time public key extracted from the decrypted request data, and the identification factor determined above. The blinded one-time public key may then be compared to the one-time public key received as part of the request message (e.g., in a clear text portion of the request message) to ensure that the keys match. If the keys match, user device may be authenticated. Otherwise, authentication may fail.

It should be noted that this method of authentication (i.e., verifying a combined ephemeral key) provides the advantage that authentication data, which may be sensitive, does not need to be transmitted in plaintext, even in encrypted form. Thus, even if the static server private key is later compromised (however unlikely), the plaintext authentication data is not exposed. Furthermore, since blinding of a key is typically irreversible, an attacker cannot derive the identification factor, let alone the authentication data used to generate the identification factor, even with knowledge of both the blinded user public key and the unblinded user public key (e.g., ephemeral public key).

At block 904, a response shared secret can be generated using the static server private key and the one-time user public key. In some embodiments, the static server public key and/or the static server private key can be blinded using a cryptographic nonce a cryptographic nonce (e.g., a random or pseudo-random data value) and/or the identification factor. The response shared secret can be generated using the blinded static server private key and the one-time user public key. In an alternative embodiment, the static server private key is not blinded. Instead, the one-time user public key is blinded. The response shared secret may be generated using any suitable method, such as ECDH.

At block 906, credential data to be included in the provisional response message is identified. The credential data may include any data specifically provisioned for the given user device (e.g., mobile device) or a given group of devices, so as to enable the user device to conduct transactions (e.g., payment transactions). Examples of credential data can include tokens, PAN, or other account information, one or more keys (e.g., LUKs used to generate cryptograms, encryption key, blinded or unblended static public keys, etc.), key derivation parameters (e.g., for deriving a SUK that is used to generate a cryptogram, a shared secret key, an encryption key, etc.), cryptogram derivation parameters, certificate chain information, transaction parameters, and any other suitable data.

The provisioning response message can also include other information such as the server computer certificate chain, a static server public key, a cryptographic nonce, and the like. The server computer certificate chain can be validated by the user device to verify the identity of the server computer, as discussed in FIG. 5. The static server public key may or may not be blinded. The static server public key may be used by the user device to generate the response shared secret.

At block 908, a response session key can be determined using the response shared secret and key derivation data, if needed. The key derivation data may include data specific to the user device or user (e.g., device identifier, user identifier, etc.). In an embodiment, the response session key may be determined in a similar fashion as described in block 510 of FIG. 5.

At block 910, a storage protection key may be determined from the response shared secret. The storage protection key may be different from the response session key and usable for encrypting the credential data. In an embodiment, the storage protection key may be determined in a similar fashion as described in block 514 of FIG. 5. For example, in an alternative embodiment, the storage protection key may be a public key provided by the user device (e.g., as part of the provisioning request message shown in FIG. 13) and not generated from the response shared secret.

At block 912, the credential data can be encrypted using the storage protection key to generate encrypted credential data. In an embodiment, the storage protection key can be used directly to encrypt the credential data. In another embodiment, the storage protection key can be used with data specific to the user or user device for which the credential data is provisioned to derive a credential encryption key, which is then used to encrypt the credential data.

In some embodiments, the storage protection and/or credential data may be deleted soon after the creation of the encrypted credential data.

At block 914, some or all data of the provisioning response message can be encrypted using the response session key. For instance, the cryptographic nonce, server computer certificate chain, key derivation data, cipher suite descriptors, and other suitable data may be encrypted using the response session key. The encrypted credential data may or may not be encrypted using the response session key. An example provisioning response message is shown in FIG. 12.

At block 916, the encrypted provisioning response message is sent to the user device. The provisioning response message may pass through one or more intermediaries (e.g., untrusted network) before reaching user device. The user device may process the encrypted provisioning message according to the process 700 of FIG. 7. An example provisioning response message is shown in FIG. 12.

Figure 10:
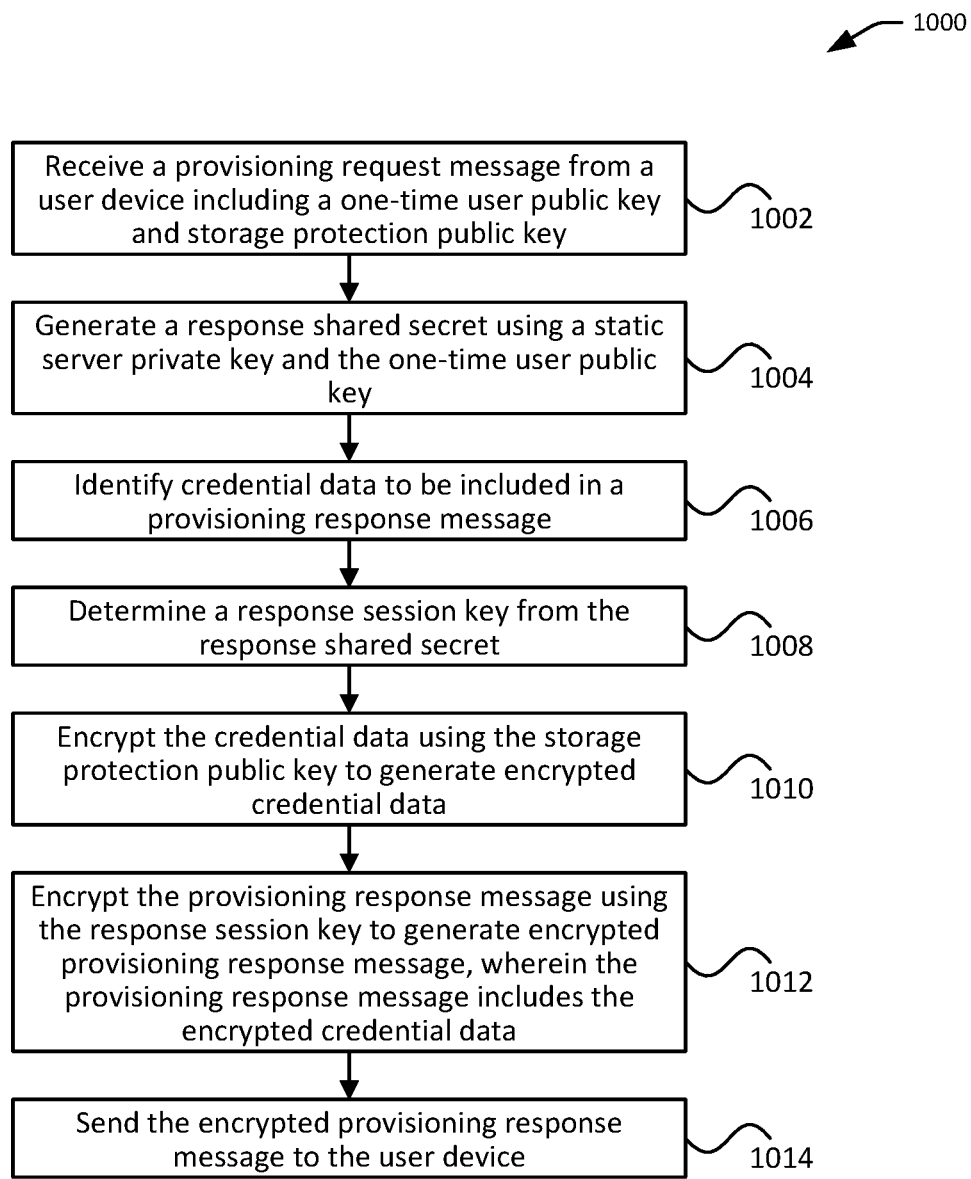
FIG. 10 show another example process for securely provisioning credential data to a user device, in accordance with some embodiments.

FIG. 10 show another example process 1000 for securely provisioning credential data to a user device, in accordance with some embodiments. In such embodiments, the credential data can be protected by a storage protection public key that is provided by the user device. Aspects of the process 1000 may be performed by a server computer such as a server device or computer 102, 103, 104, 105, 106, or 300. For instance, the process 1000 may be performed by a provisioning server. Alternatively or additionally, aspects of the process 1000 may be performed by any other suitable entities.

Typically, before method 1000, server computer maintains a static server key pair. The static server key pair may include a public key (i.e., a "static server public key") and a private key (i.e., a "static server private key"). Server computer may also comprise a "server computer certificate" including the static server public key. The server computer certificate may be signed by a certificate authority, such as payment processing network 105 or issuer computer 106.

At block 1002, a provisioning request message is received from a user device. The provision request message includes a one-time user public key and a storage protection public key such as discussed in FIG. 6. An example provisioning request message is shown in FIG. 13.

As discussed in FIG. 9, a request shared secret and a request session key can be generated and the request session key can be used to decrypt the provisioning request message to obtain the request data. The request data can include the storage protection public key and the one-time user public key. The user device can be authenticated or verified using the request data.

At block 1004, a response shared secret can be generated using the static server private key and the one-time user public key, as described in block 904 of FIG. 9.

At block 1006, credential data to be included in the provisional response message is identified, as described in block 906 of FIG. 9.

The provisioning response message can also include other information such as the server computer certificate chain, a static server public key, a cryptographic nonce, and the like. The server computer certificate chain can be validated by the user device to verify the identity of the server computer, as discussed in FIG. 6. The static server public key may or may not be blinded. The static server public key may be used by the user device to generate the response shared secret.

At block 1008, a response session key can be determined using the response shared secret and key derivation data, if needed, as described in block 908 of FIG. 9.

At block 1010, the credential data can be encrypted using the storage protection public key received in block 1002 above. In an embodiment, the storage protection public key can be used directly to encrypt the credential data. In another embodiment, the storage protection public key can be used with data specific to the user or user device for which the credential data is provisioned to derive a credential encryption key, which is then used to encrypt the credential data.

At block 1012, some or all data of the provisioning response message can be encrypted using the response session key, as described in block 914 of FIG. 9.

At block 1014, the encrypted provisioning response message is sent to the user device, as described in block 916 of FIG. 9. An example provisioning response message is shown in FIG. 13.

D. Example Data Flow

Figure 11:
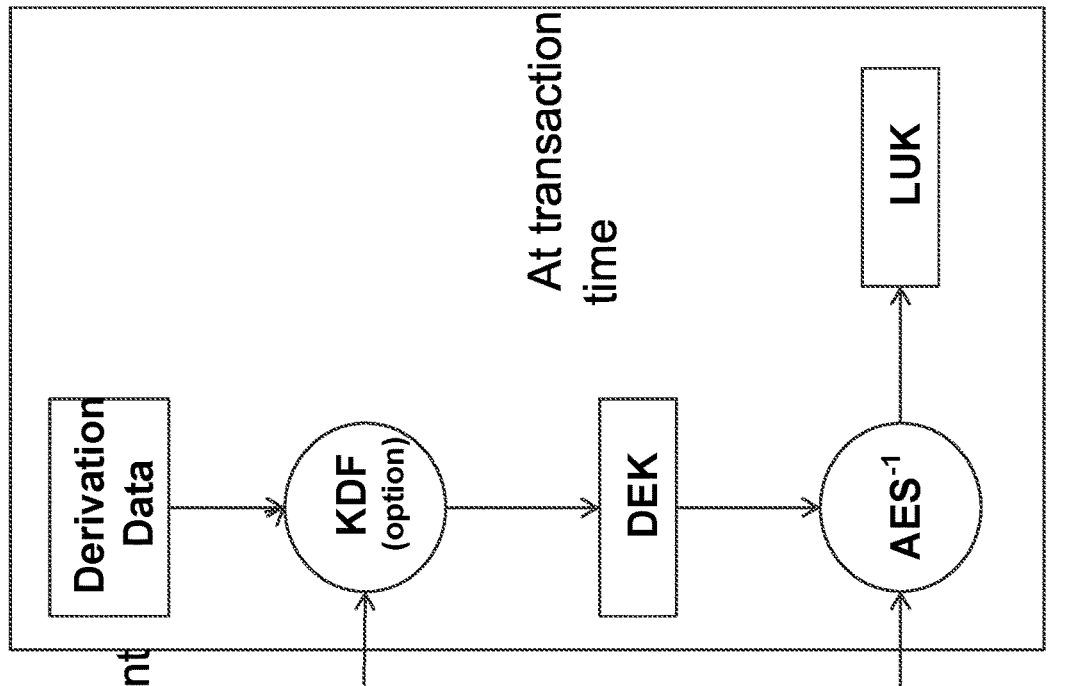
FIG. 11 shows a data flow diagram for provisioning and using credential data, in accordance with embodiments.
Figure 11:
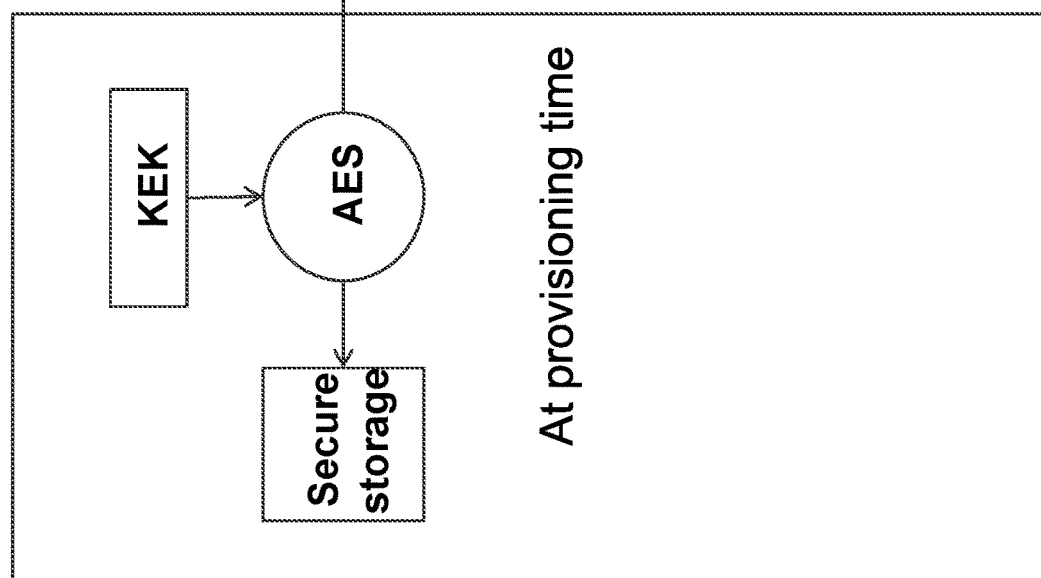

FIG. 11 shows a data flow diagram 1100 for provisioning and using credential data, in accordance with embodiments. As illustrated, a storage protection key (SK_2) can be generated at provisioning time from a key agreement protocol such as Diffie-Hellman. In some embodiments, the key agreement used to generate the storage protection key may be the same key agreement used to generate session keys discussed herein. For example, the storage protection key may be derived from a shared secret that is also used to generate a session key. In alternative embodiments, the storage protection key may be generated using a different key agreement than the key agreement used to generate the session keys. The storage protection key can be used to protect sensitive data such as credential data (e.g., LUK), whereas the session keys can be used to protect messages in transit. Thus, the storage protection key can be used in conjunction with session keys, as discussed herein, to provide end-to-end protection of the sensitive data.

In some embodiments, the storage protection key may have approximately the same life cycle (e.g., effective start data and/or expiration time) as the sensitive data (e.g., an LUK) that is protected using the storage protection key. Thus, when new credential data (e.g., LUK) is generated by a server computer, a new storage protection key is also generated to protect the credential data. In some embodiments, the credential data (e.g., LUK) and/or the storage protection key may be associated with a life cycle indicator (e.g., a counter) that indicates when/whether the associated credential data and/or storage protection key would expire. Upon expiration, the credential data and/or storage protection key may be deleted from a user device.

In some other embodiments, the storage protection key may have a longer or shorter life cycle than the sensitive data.

Prior to the first use of the credential data, the storage protection key (SK_2) may be encrypted (e.g., according to AES) using a key encryption key (KEK) and stored in a secure storage. The secure storage may be provided by a user device and/or an external storage provider accessible by the user device.

The encrypted credential data (Enc_LUK) is provisioned to a user device in a provisioning response message at provisioning time. Subsequently and prior to the first use of the credential data, credential data can be stored, in the encrypted form (Enc_LUK), on the user device and/or an external storage. The encrypted sensitive data may be retrieved and decrypted only when needed (e.g., at transaction time), thereby minimizing the exposure of and limiting the risk of compromise of sensitive data.

At transaction time, the encrypted credential data (Enc_LUK) may be retrieved and decrypted ($AES^{-1}$) to obtain the credential data (LUK). In some embodiments, the storage protection key (SK_2) is used directly as a decryption key to decrypt the encrypted sensitive data. In some other embodiments, the storage protection key (SK_2) can be used to indirectly to decrypt the encrypted credential data, as discussed below.

As illustrated in FIG. 11, the storage protection key (SK_2) may be used as an input into an optional key derivation function (KDF), along with key derivation data (Derivation Data), to derive a data encryption key (DEK). The DEK may then be used to decrypt the encrypted credential data (Enc_LUK) to obtain the credential data (e.g., LUK). In some embodiments, the key derivation data is not provided in the provisioning response message but is known to both the user device and the server computer. The key derivation data may be unique and/or specific to the user device such as a device identifier, a device fingerprint, and the like. A device fingerprint is information collected about a device for the purpose of identifying the device. Such information can include various hardware and/or software configuration information at any suitable levels such as browser settings, TCP/IP settings, wireless settings, operating system (OS) fingerprint, hardware clock skew, and the like.

The credential data (LUK) may then be used to conduct one or more transactions. For instance, the credential data (LUK) may be used to generate transaction cryptograms that may be used to authenticate the user device. In some embodiments, the response message may also indicate whether to use the optional key derivation function (KDF), how to obtain derivation data used for the KDF, or other directives regarding aspects of the decryption of the encrypted credential data.

E. Example Provisioning Messages

FIG. 12 shows a first example of a provisioning request message 1202 and a corresponding provisioning response message 1210, in accordance with some embodiments. For example, the provisioning request message 1202 may be sent by a user device (e.g., user device 101) to a provisioning server computer (e.g., payment processing network computer 105, issuer computer 106, server computer 300); and the provisioning response message 1210 may be sent from the provisioning server computer to the user device during a provisioning process such as discussed in FIGS. 4-11.

As shown in FIG. 12, in some embodiments, the provisioning request message 1202 may include three data portions: a clear text portion 1204, a cipher text portion 1206, and a message authentication code (MAC) 1208 for the message. The clear text portion 1204 can include a one-time public key of the user device (that may or may not be blinded). The MAC may be used for error detection and/or correction. The integrity of the clear text portion 1204 and the cipher text portion 1206 is protected by the MAC 1208. The MAC 1222 may be generated using the same key or a different key than the key used to generate the cipher text. Some or all portions of the request data may be encrypted (e.g., using a request session key derived from a request shared secret) to produce the cipher text portion 1206. The request data that is encrypted may include identification data and any other suitable data.

The provisioning response message 1210 corresponding to the provisioning request message 1202 may also include three data portions: a clear text portion 1212, a cipher text portion 1214, and a MAC 1216. The clear text portion 1212 can include a server public key (that may be blinded in some embodiments) and encrypted credential data 1218. The server public key can help the user device to derive the response session key that can be used to decrypt the response message. The encrypted credential data 1218 can be encrypted using a separate storage protection key that is different than the response session key (SK_s) used to encrypt some of the provisioning response data. The encrypted credential data 1218 can include a cipher text portion 1220 and a MAC 1222. The cipher text portion 1220 can include encrypted credential data such as an encrypted LUK, encrypted key derivation parameters for deriving a SUK, payment credentials such as token and/or token parameters, and the like. The MAC 1222 can be generated to protect the integrity of the cipher text portion 1220 and the clear text portion 1212. The MAC 1222 may be generated using the same key or a different key than the key used to generate the cipher text.

The cipher text portion 1214 of the response message 1210 may include other response data that has been encrypted using response session key, such as a cryptographic nonce, a server computer certificate chain, key derivation data, cipher suite descriptors, and any other suitable response data. For example, the cipher text portion 1214 may include data that indicate the key derivation function (KDF) and/or the derivation data that can be used to derive the storage protection key or credential encryption key, or any other keys.

Although FIG. 12 shows the encrypted credential data 1218 as included in the clear text portion 1212 of the response message 1210, in some other embodiments, at least a portion of the encrypted credential data 1218 may be additionally encrypted (e.g., using the response session key) and stored in the cipher text portion 1214 of the response message 1210.

FIG. 13 shows a second example of a provisioning request message 1302 and a corresponding provisioning response message 1310, in accordance with some embodiments. For example, the provisioning request message 1302 may be sent by a user device (e.g., user device 101) to a provisioning server computer (e.g., payment processing network computer 105, issuer computer 106, server computer 300); and the provisioning response message 1310 may be sent from the provisioning server computer to the user device during a provisioning process such as discussed in FIGS. 4-11. Unlike FIG. 12, the request message 1302 in FIG. 12 includes a storage protection public key that is used to encrypt credential data (e.g., LUK) in the response message 1310.

As shown in FIG. 13, in some embodiments, the provisioning request message 1302 may include three data portions: a clear text portion 1304, a cipher text portion 1306, and a message authentication code (MAC) 1308 for the message. The clear text portion 1304 can include a one-time public key of the user device (that may or may not be blinded). The one-time public key may be similar to that described in the request message 1204 of FIG. 12. The MAC may be used for error detection and/or correction. The integrity of the clear text portion 1304 and the cipher text portion 1306 is protected by the MAC 1308. The MAC 1308 may be generated using the same key or a different key than the key used to generate the cipher text. Some or all portions of the request data can be encrypted (e.g., using a request session key derived from a request shared secret) to produce the cipher text portion 1306.

The cipher text portion 1308 of the request message 1302 can include a storage protection public key 1307 that can be used to encrypt credential data (e.g., LUK) in the response message 1310. The storage protection public key 1307 can be a public key of a public/private storage protection key pair generated and/or maintained by the user device. The storage protection private key can be used to decrypt the encrypted credential data. The storage protection key pair may be a different key pair than the user public/private key pair used to generate the shared secrets (e.g., request shared secret and response shared secret). Alternatively, the storage protection key pair and the user key pair may share the same private key. For instance, the same user private key can be used to generate two public keys, one for the purpose of protecting credential data (storage protection public key) and the other for the purpose of protecting messages in transit.

The storage protection public and/or private keys may be limited use keys. For instance, a new storage protection key pair may be generated for each new request or new transaction. In some other cases, a new storage protection key pair may be generated for a predetermined period of time or for a predetermined number of requests or transactions. In some embodiments, the public/private storage key pair may have the same life cycle as the credential data (e.g., LUK). In other embodiments, the storage protection public/private key pair may have a shorter or longer life cycle than the credential data.

The provisioning response message 1310 may also include three data portions: a clear text portion 1312, a cipher text portion 1314, and a MAC 1316. The clear text portion 1312 can include a server public key (that may be blinded in some embodiments). The server public key can help the user device to derive the session key to decrypt the response message. Some or all of the response data may be encrypted using a response shared secret (SK_s) to produce the cipher text portion 1314. For instance, the cipher text portion 1314 can include encrypted credential data 1318 that is encrypted using the storage protection public key 1307 that is provided in the request message 1302. The encrypted credential data 1318 can include a cipher text portion 1320 and a MAC 1322 thereof. The cipher text portion 1320 can include the encrypted credential data such as an encrypted LUK, encrypted key derivation parameters for deriving a SUK, payment credentials such as token and/or token parameters, and the like. The integrity of the clear text portion 1312 and the cipher text portion 1314 is protected by the MAC 1316. The MAC 1316 may be generated using the same key or a different key than the key used to generate the cipher text. In some embodiments, the encrypted credential data may or may not be further encrypted using the response session key.

The cipher text portion 1314 of the response message 1310 may include other response data that has been encrypted using response session key, such as a cryptographic nonce, a server computer certificate chain, key derivation data, cipher suite descriptors, and any other suitable response data.

Although FIG. 13 shows the encrypted credential data 1318 as included in the cipher text portion 1314 of the provisioning response message 1310, in other embodiments, at least a portion of the encrypted credential data 1318 may be included in the clear text portion 1312 of the provisioning response message 1310.

III. Types of Transactions

The techniques described herein can be used to provision credential data for conducting transactions. The transactions may include payment transactions or non-payment transactions. For instance, a user device may communicate with a server computer in order to access one or more resources in one or more non-payment transactions.

For example, the user device and a server computer may communicate during a provisioning process to provision credentials (e.g., a LUK) to the user device. The communications can be performed in a similar manner as discussed above in FIGS. 4-10.

The provisioned credentials may be used in generate cryptograms or other authentication tokens used to authenticate user device in subsequent transactions. The cryptogram or authentication tokens may be verified by a server computer that may or may not be the same as the provisioning server. Based on the authentication results, access to server resources may be provided or denied.

In various embodiments, a resource may include computing resources that are accessible via a computing device. Such computing resources can include data objects, computing devices or hardware/software components thereof (e.g., CPU, memory, applications), services (e.g., web services), virtual computer systems, data storage or management, network connections and interfaces, the like. For example, a resource can include one or more computing devices (e.g., desktop, laptop, tablet, mobile phone), files or other data stored in the computing devices, memory or data storage device associated with the computing devices, applications installed on the computer devices, peripheral devices associated with the computing devices such as input/output devices (e.g., keyboard, mouse, microphone, touchscreen, printer), network interfaces, services provided by the computing devices, and the like. Computing resources can include online or cloud-based services or functionalities provided by service providers. Computing resource can include one or more storage devices, nodes, systems, or a portion thereof such as a partition, a volume, a sector, and the like. Computing resources can also include data objects such as credentials (e.g., username, passwords, cryptographic keys, digital certifications). In this case, a master credential may be required to access these credentials. A resource can include tangible and/or intangible resources. Tangible resources can include devices, buildings, and physical objects. Intangible resources can include services and time, for example.

IV. Computer Apparatus

Figure 14:
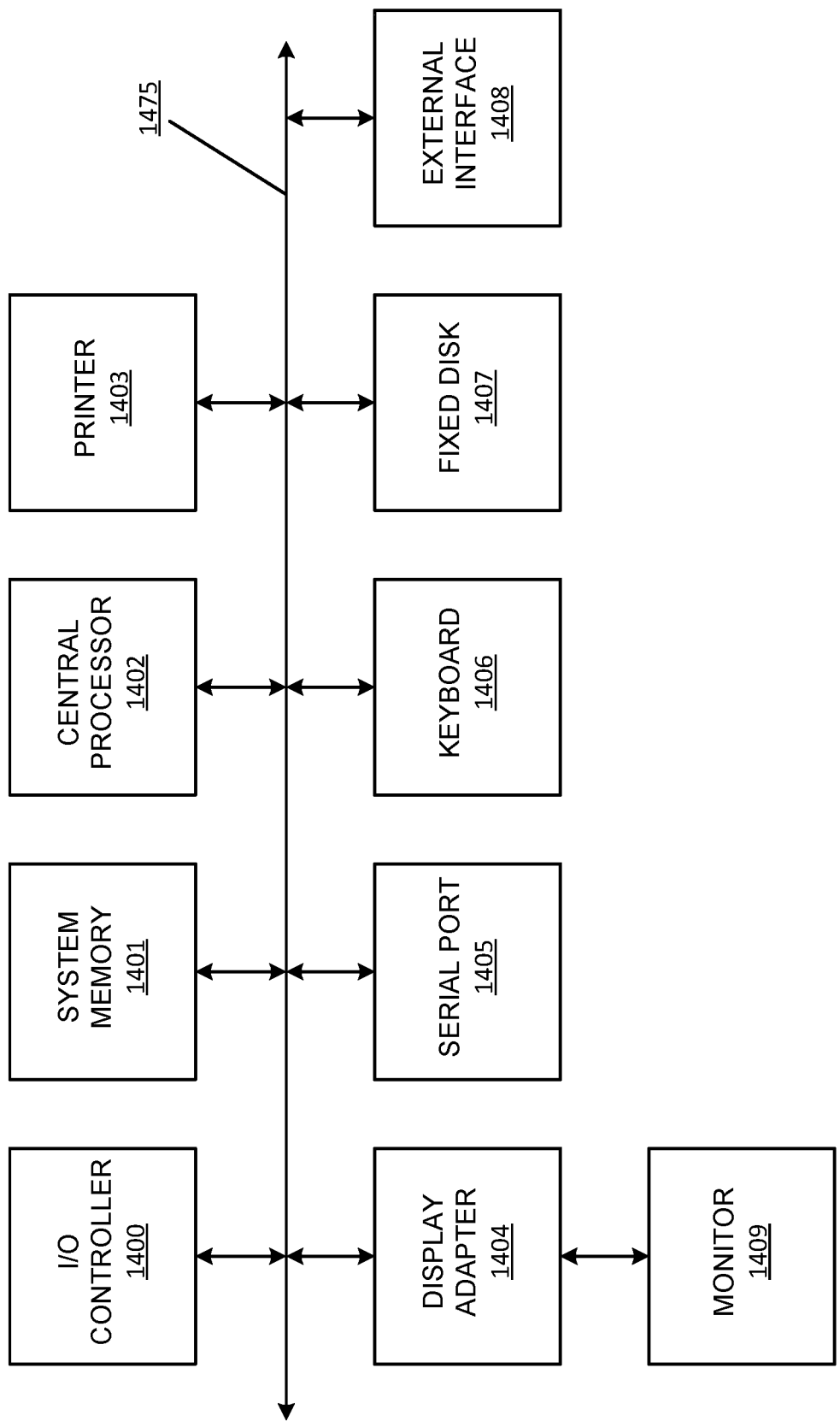
FIG. 14 shows a high level block diagram of a computer system that may be used to implement any of the entities or components described above.

FIG. 14 shows a high level block diagram of a computer system that may be used to implement any of the entities or components described above. The subsystems shown in FIG. 14 are interconnected via a system bus 1475. Additional subsystems include a printer 1403, keyboard 1406, fixed disk 1407, and monitor 1409, which is coupled to display adapter 1404. Peripherals and input/output (I/O) devices, which couple to I/O controller 1400, can be connected to the computer system by any number of means known in the art, such as a serial port. For example, serial port 1405 or external interface 1408 can be used to connect the computer apparatus to a wide area network such as the Internet, a mouse input device, or a scanner. The interconnection via system bus 1475 allows the central processor 1402 to communicate with each subsystem and to control the execution of instructions from system memory 1401 or the fixed disk 1407, as well as the exchange of information between subsystems. The system memory 1401 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method, comprising:
    determining, by a user device, a one-time user public key;
    determining, by the user device, a storage protection public key;
    sending, by the user device to a provisioning server computer, a provisioning request message including the one-time user public key and the storage protection public key;
    receiving, by the user device, an encrypted provisioning response message from the provisioning server computer, the encrypted provisioning response message comprising encrypted credential data, wherein the encrypted credential data is encrypted using the storage protection public key;
    determining, by the user device, a response shared secret using a static server public key;
    determining, by the user device, a response session key from the response shared secret, the response session key usable for decrypting the encrypted provisioning response message;
    decrypting, by the user device, the encrypted provisioning response message using the response session key to determine the encrypted credential data; and
    storing, by the user device, the encrypted credential data.

2. The computer-implemented method of claim 1, wherein the storage protection public key and the one-time user public key both correspond to a same user private key.

3. The computer-implemented method of claim 1, wherein the storage protection public key and the one-time user public key correspond to different user private keys.

4. The computer-implemented method of claim 1, further comprising:
    in response to an indication to generate a cryptogram used for authenticating an authorization request message, retrieving the encrypted credential data;
    decrypting the encrypted credential data using a storage protection private key corresponding to the storage protection public key to obtain the credential data; and
    generating the cryptogram using the credential data.

5. The computer-implemented method of claim 4, further comprising:
    encrypting the storage protection private key using a key encryption key;
    storing the encrypted storage protection private key;
    retrieving the encrypted storage protection private key; and
    decrypting the encrypted storage protection private key using the key encryption key to obtain the storage protection private key that is used in decrypting the encrypted credential data.

6. The computer-implemented method of claim 1, wherein determining the one-time user public key comprises generating an ephemeral user key pair comprising an ephemeral user private key and an ephemeral user public key, wherein the ephemeral user public key is used as the one-time user public key.

7. The computer-implemented method of claim 1, wherein the provisioning request message further comprises supplementary data including identification data, a user device identifier, or authentication data, and wherein the response session key is determined using the supplementary data.

8. The computer-implemented method of claim 1, wherein a portion of the provisioning request message is encrypted using a request session key that is derived from a request shared secret, the request shared secret generated using the static server public key and a user private key corresponding to the one-time user public key.

9. The computer-implemented method of claim 1, wherein determining the response session key from the response shared secret further comprises inputting key derivation data and the response shared secret into a key derivation function (KDF).

10. The computer-implemented method of claim 1, wherein the encrypted credential data is stored in a secure module of the user device.

11. The computer-implemented method of claim 1, wherein a storage protection private key corresponding to the storage protection public key is stored in a different location than the encrypted credential data.

12. The computer-implemented method of claim 1, wherein the credential data comprises a limited use key (LUK) and cryptogram key derivation data usable for deriving a cryptogram key that is used to generate a cryptogram.

13. The computer-implemented method of claim 1, wherein the encrypted credential data is stored in a storage server remotely connected to the user device.

14. A computer system, comprising:
    a memory that stores computer-executable instructions; and
    a processor configured to access the memory and execute the computer-executable instructions to implement a method comprising:
        determining a one-time user public key;
        determining a storage protection public key;
        sending to a provisioning server computer a provisioning request message including the one-time user public key and the storage protection public key;
        receiving an encrypted provisioning response message from the provisioning server computer, the encrypted provisioning response message comprising encrypted credential data, wherein the encrypted credential data is encrypted using the storage protection public key;

determining a response shared secret using a static server public key;

determining a response session key from the response shared secret, the response session key usable for decrypting the encrypted provisioning response message;

decrypting the encrypted provisioning response message using the response session key to determine the encrypted credential data; and storing the encrypted credential data.

15. The computer system of claim 14, wherein the storage protection public key and the one-time user public key correspond to different user private keys.

16. The computer system of claim 14, wherein the method further comprises:

in response to an indication to generate a cryptogram used for authenticating an authorization request message, retrieving the encrypted credential data;

decrypting the encrypted credential data using a storage protection private key corresponding to the storage protection public key to obtain the credential data; and generating the cryptogram using the credential data.

17. The computer system of claim 14, wherein the credential data comprises a limited use key (LUK) and cryptogram key derivation data usable for deriving a cryptogram key that is used to generate a cryptogram.

18. The computer system of claim 14, wherein a storage protection private key corresponding to the storage protection public key is stored in a different location than the encrypted credential data.

19. The computer system of claim 14, wherein the storage protection public key and a corresponding storage protection private key are encrypted using a key encryption key before being stored.

20. The computer system of claim 14, wherein a portion of the provisioning request message is encrypted using a request session key that is derived from a request shared secret, the request shared secret generated using the static server public key and a user private key corresponding to the one-time user public key.

* * * * *